United States Patent [19]

Gast et al.

[11] 4,414,635

[45] Nov. 8, 1983

[54] METHOD AND CIRCUIT FOR RECOGNITION OF COLORS

[75] Inventors: Uwe Gast, Rammsee; Eggert Jung, Schönberg; Franz Kuhn, Schönkirchen; Klaus Möllgaard, Kiel; Friedrich Redecker, Heikendorf; Ulrich Sendtko, Kiel; Rüdiger Sommer, Raisdorf; Klaus Wellendorf; Hans-Georg Knop, both of Heikendorf, all of Fed. Rep. of Germany

[73] Assignee: Dr.-Ing. Rudolf Hell GmbH, Kiel, Fed. Rep. of Germany

[21] Appl. No.: 324,615

[22] Filed: Nov. 24, 1981

Related U.S. Application Data

[63] Continuation of Ser. No. 98,348, Nov. 28, 1979, abandoned.

[30] Foreign Application Priority Data

| Nov. 28, 1978 | [DE] | Fed. Rep. of Germany | 2851452 |
| Jun. 9, 1979 | [DE] | Fed. Rep. of Germany | 2923468 |
| Jun. 9, 1979 | [DE] | Fed. Rep. of Germany | 2923473 |
| Jun. 9, 1979 | [DE] | Fed. Rep. of Germany | 2923477 |

[51] Int. Cl.³ .......................... G01J 3/50; G06F 15/20
[52] U.S. Cl. .................................... 364/526; 250/226; 356/405; 358/75
[58] Field of Search .................. 364/526; 358/75, 78; 356/403, 405, 406, 419, 425; 250/226

[56] References Cited

U.S. PATENT DOCUMENTS

| 3,745,037 | 7/1973 | Bowker | 358/78 X |
| 3,752,590 | 8/1973 | Frappe | 356/176 |
| 3,778,541 | 12/1973 | Bowker | 358/75 |
| 3,783,275 | 1/1974 | Oelmayer et al. | 250/226 |
| 3,878,384 | 4/1975 | Bowker | 364/526 X |
| 3,924,244 | 12/1975 | Seitz | 364/526 X |
| 4,060,829 | 11/1977 | Sakamoto | 358/80 |
| 4,110,826 | 8/1978 | Möllgaard et al. | 364/526 |
| 4,194,839 | 3/1980 | Knop | 250/226 X |
| 4,203,671 | 5/1980 | Takahashi et al. | 356/402 |
| 4,236,194 | 11/1980 | Norman | 362/370 |

FOREIGN PATENT DOCUMENTS

| 1170947 | 11/1969 | United Kingdom . |
| 1190600 | 5/1970 | United Kingdom . |

*Primary Examiner*—Jerry Smith
*Attorney, Agent, or Firm*—Ernest F. Marmorek

[57] ABSTRACT

An apparatus and a method for the recognition of colors on a colored image illuminated with a light source of a known spectrum composition, wherein the intensities of three primary colors are measured opto-electronically as color components, which represent the spatial coordinates of the color locations in a color space. Prior to color recognition the color components of at least one characteristic test point in each color or color region, which is to be recognized, are measured and noted. The test color components represent the corresponding test color locations in the color space. An identification symbol is assigned to each color component triplet of the test points and noted too. The plurality of color locations in the color space are associated automatically with identification symbols in dependence their respective positions with respect to a spatially close-by test color location, whereby all color locations associated with the same identification symbol appertains to one color recognition region within the color space. Then the colored image is scanned opto-electronically for actual color recognition and the color components thereby obtained are compared with the color components noted, and in case of correspondence, the corrresponding assigned identification symbol is read out, whereby the color components of the colors are verified regarding their correspondence to one of the defined color recognition regions of the color space.

39 Claims, 19 Drawing Figures

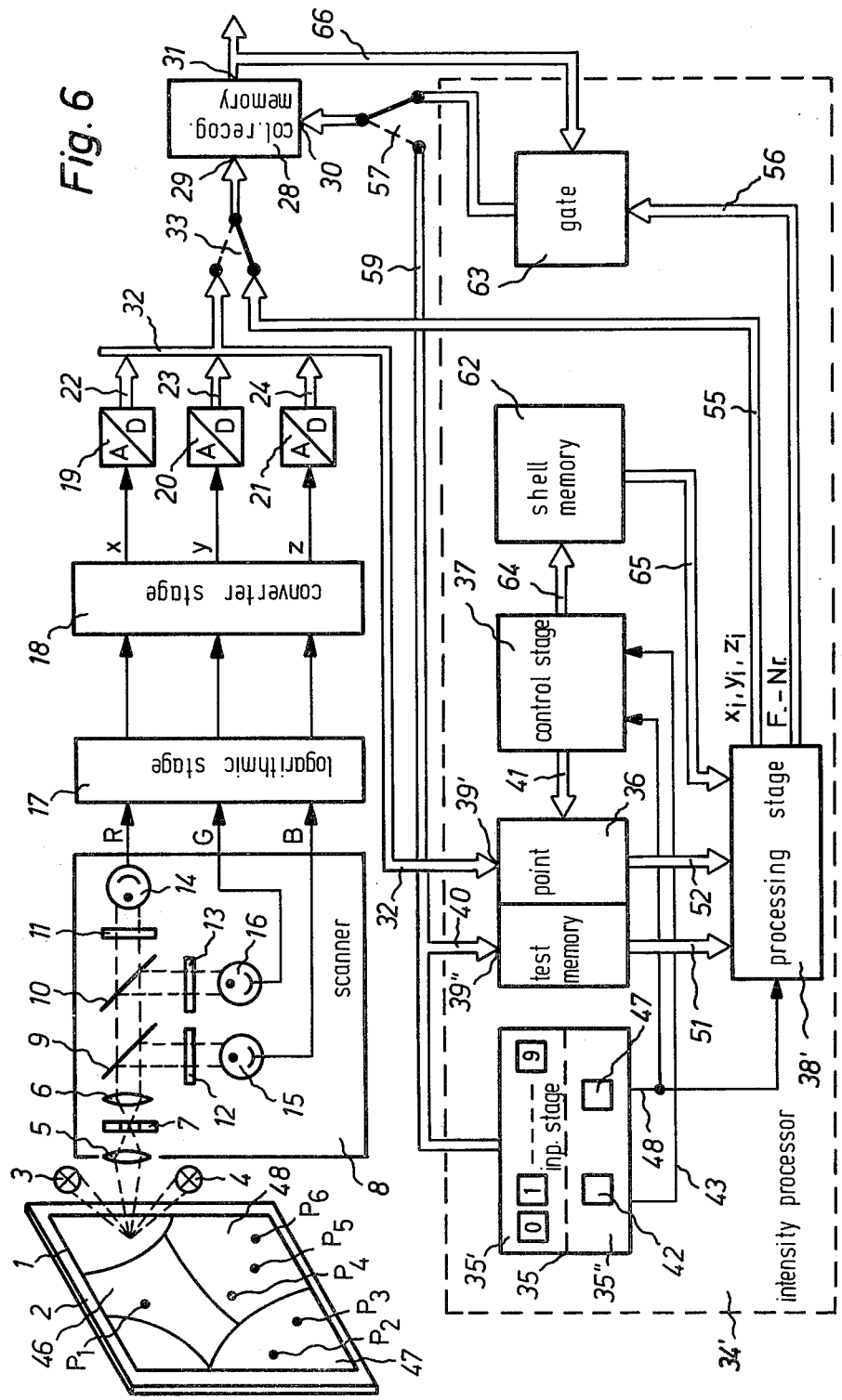

METHOD AND CIRCUIT FOR RECOGNITION OF COLORS

This is a continuation of application Ser. No. 98,348, filed on Nov. 28, 1979 and now abandoned.

BACKGROUND OF THE INVENTION

The invention relates to a method and an apparatus for the recognition and processing of colors.

The colored images which the invention processes include images or patterns which are to be reproduced, patterns for obtaining control data for textile processing machines, colored printing media, and in general any colored surface or plane.

During trichromatic scanning of colored images, there are produced for each color trichromatic color-measuring signals for the colors red, green and blue, which represent the components of the particular color, or the color-coordinates of the associated color location in the red/gree/blue color space.

In a colored image, there occur fluctuations of the color or changes in color, which, on one hand, are intentional on the part of the designer, but on the other hand may be caused due to color tolerances of colors commercially obtainable, or due to any irregular application of colors. These fluctuations of the individual colors occurred within limited spatial color regions, which are recognized as a color, when determining colors or separating colors, and to which color regions there correspond spatial color recognition regions in the red/green/blue color space.

A color selection circuit then determines continuously, to which of the aforenoted color recognition regions trichromatic color-measuring signals obtained by scanning of the colored image are to be assigned, and which indicate the presence of a color.

Such color selection circuits are used, for example, in color scanners for the manufacture of individual color separators for multi-color printing, or for textile printing, decorative printing or for printing for packing purposes.

When manufacturing color separations for multiple color printing (printing on paper), a color correction is made, which on one hand takes into account any color-wise inadequate quantity of the printing colors, or by means of which any editorially desired color rendition of the reproduction can be changed with respect to the original. In addition to a basic correction, an additional selective correction is made, which only affects certain colors. The problem arises therefore to select with the aid of a color selection circuit only those colors, which must be subjected to a special correction.

Contrary to the multi-printing process, the colors in textile, decorative, or package-printing are mixed prior to printing, and then transferred separately on the printing medium. Here the problem arises to separate the individual colors of the image by means of a color selection circuit from one another, and to obtain a color separation for each color.

A color selection circuit is also needed in a scanner for designed patterns to obtain control data for textile processing machines. Here a similar problem arises, namely to select individual colors from a drawing or pattern having multiple colors. These colors are then converted into control data, and stored on a data carrier as color information.

From U.S. Pat. No. 3,210,552 there has become known a color selection circuit, where the desired boundaries in a color recognition region are formed by electronically adjustable threshold circuits. The apportionment of a color to be identified to the appropriate color recognition region is obtained by comparing the trichromatic color-measuring signals with the suitably adjusted thresholds.

Although the magnitude of the color recognition region is adjustable, it is substantially shaped like a parallelepiped or cube.

The known color selection circuit has a disadvantage, that the shape of the color recognition region cannot be optimally tailored to a color region to be separated, so that errors occur during the color recognition process. It is a further disadvantage, that it is hardly possible, to match the selection circuit to the particularities of the image to be analyzed. The individual adjustment of the thresholds has shown itself to be particularly difficult, for there is no imaginable connection between the color space, on one hand, and the electrical thresholds on the other hand. If a plurality of colors are to be separated, an equal plurality of thresholds or threshold circuits must be used and adjusted, which is very time-consuming and costly.

A variant of the color recognition has become known from U.S. Pat. No. 3,012,666, in which the spatial color recognition is reduced to a two-dimensional problem. The color recognition regions are limited by straight lines, which in turn are simulated by threshold circuits.

In practice it has been shown, however, that even this method does not provide any satisfactory results, as the reliability of the color recognition is often inadequate. There is the additional advantage that as a result of the "banana-like" shape of the color recognition regions, as disclosed in U.S. Pat. No. 3,012,666, it is difficult to fill the whole color space without leaving any gap, with color recognition regions, which in turn also leads to uncertainty during the color recognition process.

SUMMARY OF THE INVENTION

One of the principal objects of the invention is to accommodate the color recognition regions in the color space to the colors or spatial color regions available on the image prior to the recognition process, thereby securing considerable reliability of recognition. Therefore the color components of at least one characteristic test point in each color range, which is to be recognized, are measured and noted or memorized. Those test color components represent the corresponding test color locations in the color space. The test color locations act therefore as a sort of scaffolding, around which the color recognition regions are constructed automatically to achieve such an accommodation.

Further objects and advantages of the invention will be set forth in part in the following Specification, and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings in which:

FIG. 6 is a second version of a circuit for recognizing colors;

DESCRIPTION OF THE PREFERRED EMBODIMENTS

Figure 1:
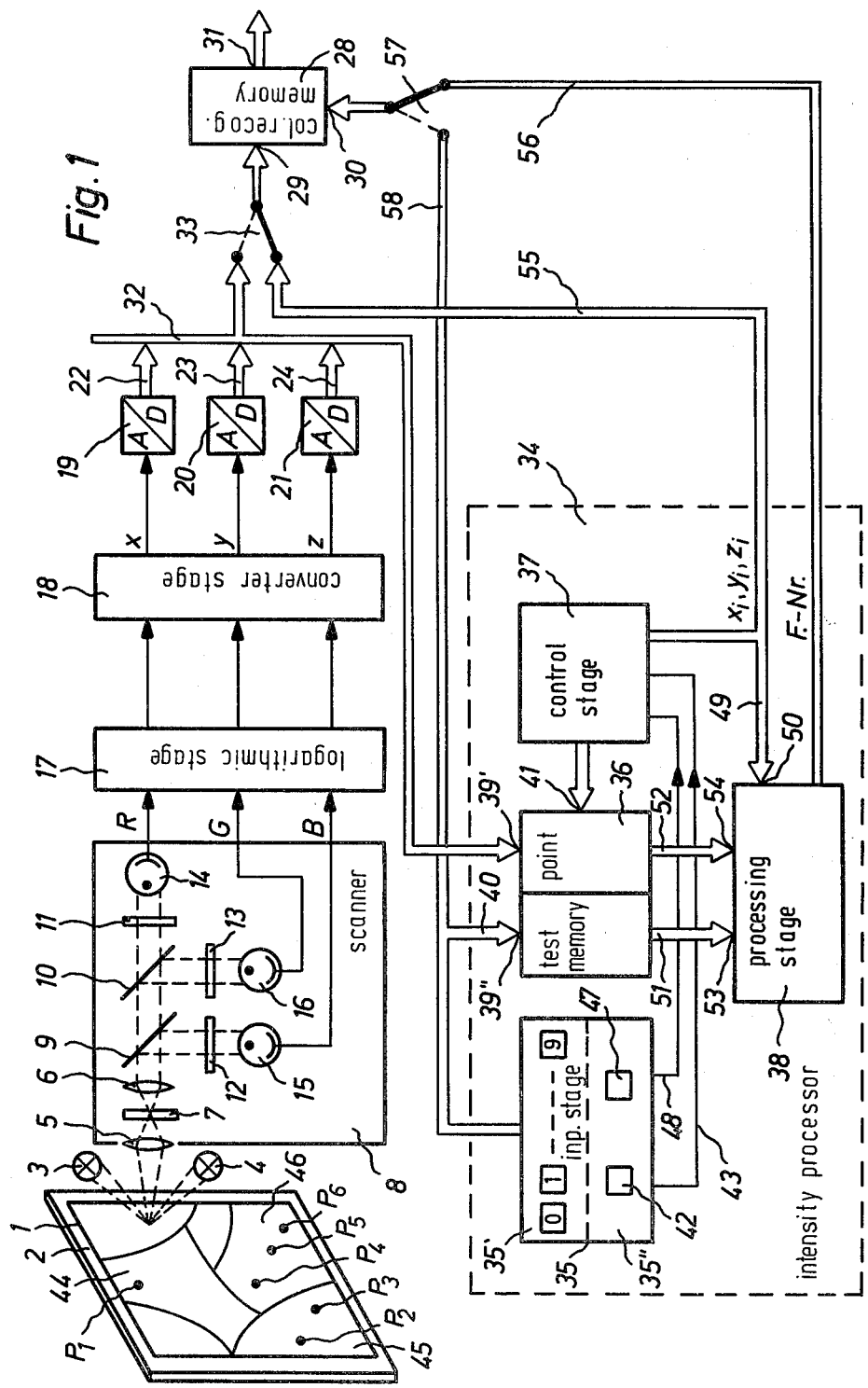
FIG. 1 shows a first circuit for color recognition.
Figure 2:
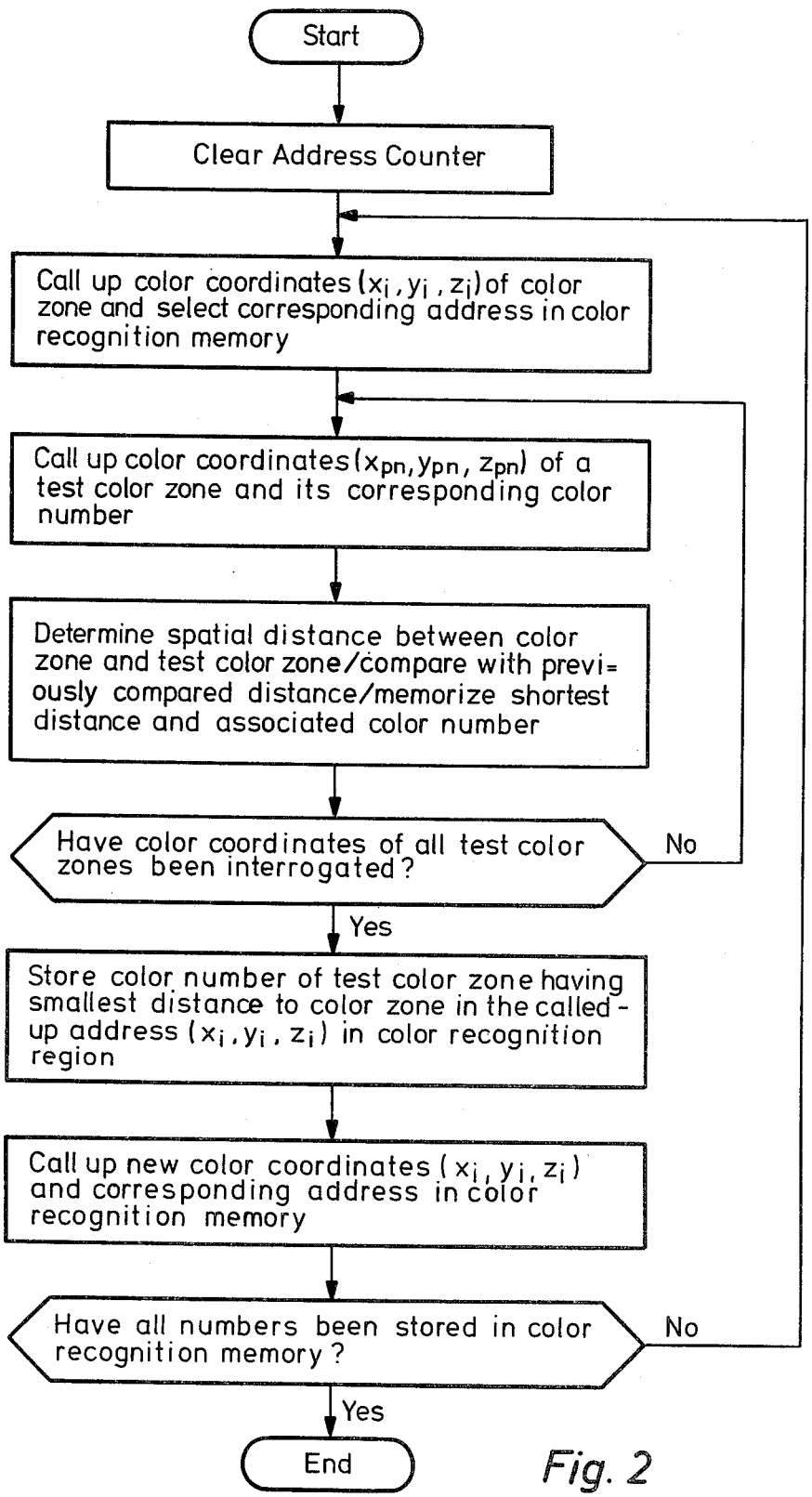
FIG. 2 is a flow diagram illustrating the operation of the circuit of FIG. 1.

In carrying the invention into effect, there is shown in FIG. 1 a first embodiment of a circuit for recognizing colors, or separating colors, while FIG. 2 shows a flow diagram to illustrate the operation of the circuit.

The image to be analyzed may be an image or pattern for multiple color printing, or for textile printing, decorative printing or package printing, or also a design pattern for obtaining control data for textile processing machines. The colored image may include a color printing medium and generally any colored surface or plane.

The colored image will generally include separate, adjoining colors, and colors vignetting into one another. The individual colors may, for example, due to color tolerances or due to an irregular application of the color, show color deviations. During color recognition, the problem arises to separate the individual colors from one another, or, if necessary, to combine color deviations in the colored image into a single color. In colors vignetting into one another, namely in colors showing gradual saturation and/or brightness changes, such color deviations have been intended by the designer. The color recognition process must cope with the problem to either separate the colors vignetting into one another, or, if necessary, to combine some colors vignetting into one another into a single color.

The colored image 1, which is mounted on a carrier 2, is illuminated by two light sources 3 and 4 of known spectral composition, and the reflected or transmitted scanned light passes via lenses 5 and 6, and via a light stop 7 to a scanner 8. In the scanner 8, the scanned light is split by means of two dichroic color sparators 9 and 10 into three partial beams, which pass through color correction filters 11, 12 and 13 and impinge on three photo-electric transducers 14, 15 and 16 respectively. The transducers 14, 15 and 16 transform each partial light beam according to the intensities of the color components of the scanned colors into trichromatic color-measuring signals, or color triplets red, green and blue, which represent the spatial coordinates of the associated color locations in the cartesian red, green and blue color space.

Each trichromatic color-measuring signal red, green and blue passes through a logarithmic stage 17, where it is amplitude or gamma-corrected and/or modified according to a predetermined gradation curve.

In a color converter stage 18, the trichromatic color-measuring signals red, green and blue are transformed by an appropriate matrix into chrominance signals x and y, and into a luminance signal z according to the relations:

$$x = a_{11}R + a_{12}G + a_{13}B$$

$$y = a_{21}R + a_{22}G + a_{23}B$$

$$z = a_{31}R + a_{32}G + a_{33}B$$

This matrix transformation corresponds to a transformation of the red, green and blue color space into a chrominance-luminance color space. The chrominance signals x and y represent the color coordinates of the color locations in the chrominance plane, and the luminance signal z represents the third coordinate or grey axis. Transformations of this type are known in color television.

The chrominance signals x and y, and the luminance signal z are converted in analog-to-digital transducers 19, 20, and 21 into digital signals, each signal having a word length of five bits each, which signals pass to outputs 22, 23 and 24 respectively. Digitizing of these signals may be accomplished with different respective quantizations.

Figure 3:
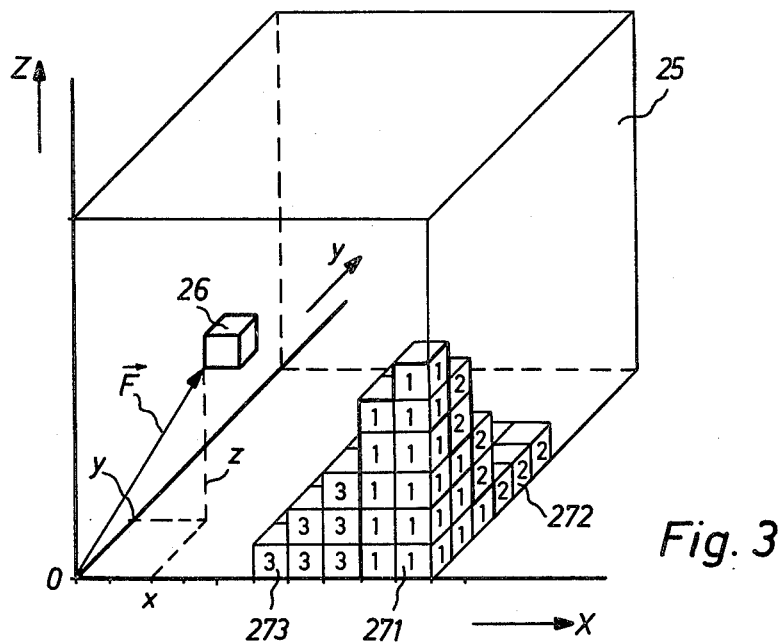
FIG. 3 shows a chrominance-luminance color space subdivided into individual color zones.

FIG. 3 shows by way of example how the chrominance-luminance color space 25 is subdivided into a multiplicity of color zones 26, in the example shown into 32×32×32, but of which only a few have been shown for clarity. The color of a color zone 26, or its position in the chrominance-luminance color space 25 is defined by a spatial vector F or by corresponding spatial coordinates x, y and z in the color space.

Arbitrarily selectable identification symbols, for example color numbers 1, 2, 3, etc are assigned to the individual color zones 26. Each color or spatial color region of the colored image 1, which is to be recognized as a single color during color separation, is defined in the chrominance color space 25 by a color recognition region 27. The color zones 26, which form a part of the same color recognition region, are assigned identical color numbers. Thus, FIG. 3 shows a first color recognition region 271, each color location thereof being denoted with the numeral "1", as well as portions of a second recognition region 272 with a color number "2" and a third color recognition region 273 with a color number "3". The number of the color recognition regions depends on the number of the colors to be separated. In general, the individual color recognition regions border one another without any gap occurring, so that there are no undefined regions.

The circuit for recognition of colors, according to FIG. 1, includes a color recognition memory 28, which has an address input 29, a data input 30, and a data output 31. In the example shown, the color-recognition memory 28 has a capacity of 32×32×32 at four bits per word. A color zone 26 is assigned to each address location in the chrominance-luminance color space 25. Each address location may be addressed by the color coordinates x, y and z of the corresponding color zone 26. The numbers of the color zones may be stored in the address locations, which are associated with respective color zones 26.

The outputs 22, 23 and 24 of the analog-to-digital transducers 19, 20 and 21 are fed to an address bus 32, which is connected to the address input 29 of the color recognition memory 28 through a switch 33. The digital signals x, y and z, each having a word length of five bits, are successively combined to yield an address length of fifteen bits for selecting the address location via the address bus 32, and are then fed to the color recognition memory 28.

For a subsequent color recognition of the colors on the image, the desired numerals are assigned to respective color coordinate combinations x, y, and z, and are then stored in corresponding address locations of the color recognition memory 28.

During the actual color recognition process, the scanner 8 then scans the colored image 1 point by point, and line by line, by a relative movement between the scanner 8 and the image carrier 2. The color coordinates, or equivalent addresses obtained thereby, then call up via the address bus 32, and the switch 33, the corresponding color numbers in the color recognition memory 28, which are then read out via the data output 31 from the color recognition memory 28, and are then processed further. The switch 33 is then positioned in the position shown dotted.

If, for example, a certain color range is to be recognized only as a single color, and alloted a number "N", then all color coordinate combinations x, y and z or address combinations, belonging to that certain color range are assigned the color number "N" in the color recognition memory 28. If these address combinations are repeated during subsequent scanning of the image, the corresponding color will be recognized as a color associated with the color number "N".

If the color content of the colored image 1 is considerably smaller than the color content theoretically available in the red, green, and blue, color space or the chrominance-luminance color space, then the digitized intensities of each color range can be advantageously reassigned, in proportion to the available color content, to corresponding address locations in the color recognition memory 28 for better, or more complete utilization of the color recognition memory 28.

In practice, it is often necessary to separate a large number of sample colors from one another, so that a correspondingly large number of color recognition regions must be defined, and a corresponding number of color numbers must be stored in the color recognition memory 28.

The color numbers are obtained, and the color recognition memory 28 is filled, according to the present invention, by analyzing the colored image 1 with the aid of the scanner 8, and a color intensity processor 34.

The color intensity processor 34 includes an input stage 35, a test point memory 36, an address control stage 37, and a calculating or processing stage 38. The input stage 35 includes a first operator area 35', on which there are disposed ten keys for the selection of the color number, and a second operator area 35", which includes a plurality of operating keys.

The operation of the color intensity processor 34 will now be explained further below.

In order to obtain the requisite large number of color numbers required for a complete or almost complete filling of the color recognition memory 28, according to the invention there are obtained at first a considerably smaller number of test point colors from the colored image 1 than would correspond to all the colors available on the colored image 1, and color numbers are assigned to these test point colors. Thus, a scaffolding is created, from which the color numbers required for the construction of the color recognition regions are automatically obtained, and subsequently stored in the color recognition memory 28.

DETERMINATION OF TEST POINT COLORS

In a first step, at least one test point color is obtained for each color to be recognized from the colored image 1, and each test point color is assigned a color number. The scanner 8 then scans characteristic test points $P_n$ of the individual colors yielding measured color signals red, green and blue. The test point color coordinates $x_{pn}$, $y_{pn}$ and $z_{pn}$ obtained in this way are then fed via the address bus 32 to the data input 39' of a test point memory 36. At the same time, the operator obtains a roster of test points or test point colors, by associating through the input stage 35 each trichromatic set of test point color coordinates $x_{pn}$, $y_{pn}$ and $z_{pn}$ (fifteen bits) with a color number "N" (four bits), which roster of test points or test point colors are fed via the data bus 40 to the data input 39" of the test point memory 36.

Each line of the roster of test points or test point colors, is stored in the test point memory 36 in terms of nineteen bit words under respective addresses, which are called up by the address control stage 37 via the address input 41 of the test point memory 36. For this purpose, the operator actuates between the individual test point extractions an operating key 42 denoted "Test" in the operating area 35" of the input stage 35, which has the effect that a corresponding order on a lead 43 increases the addresses in the address control stage 37 by one each.

The number of test point colors to be obtained depends substantially on the type of the colors to be recognized, on the color image, and on the required precision or accuracy, in separating colors.

An example for obtaining a roster of test points or test point colors is given below.

Assume that a color to be recognized as "blue" on a surface 44 of the color image 1 has a uniform saturation and brightness. In this case, it is adequate, to extract only one test point color in a test point $P_1$, and to assign, for example, the test point color coordinates $x_{p1}$, $y_{p1}$ and $z_{p1}$ of the recognition color "blue", the color number "1".

A second color to be recognized on a surface 45 of the colored image 1 may actually consist of two or more colors, for example, it may show color ranges "light red" and "dark red", which are combined into a single color "red" to be recognized.

In such a case, the test point $P_2$ in the corresponding color range is measured as "light red", but the test point color coordinates $x_{p2}$, $y_{p2}$ and $z_{p2}$ are assigned a color number "2" of the color "red" to be recognized.

Subsequently, a test point color is extracted from the color range "dark red" by means of the test point $P_3$, and the test point color coordinates $x_{p3}$, $y_{p3}$ and $z_{p3}$ are also assigned the color number "2" of the color "red" to be recognized.

A third color in another surface 46 of the colored image 1 may also consist of two or more colors, and may, for example, include the color regions "light yellow", "medium yellow" and "dark yellow" which are to be separated from one another. In such a case, at least one test point color is extracted from each color range (test points P4, P5 and P6) and the associated test color coordinates $x_{p4}$, $y_{p4}$ and $z_{p4}$ are assigned a color number "3" of the color "light yellow" to be recognized, the test point color coodinates $x_{p5}$, $y_{p5}$ and $z_{p5}$ are assigned a color number "4" of the color "medium yellow" to be recognized, and finally the test point color coordinates $x_{p6}$, $y_{p6}$ and $z_{p6}$ are assigned the color number "5" of the color "dark yellow" to be recognized.

Upon the extraction of a test point color from the $n^{th}$ test point and the assignment of a color number "N", the following list of test points or test point colors has now been ascertained and stored:

| Test Point | Address | Storage Values | |
|---|---|---|---|
| | | Color No. | Test point color coordinates |
| P1 | 1 | 1 | $x_{p1}, y_{p1}, z_{p1}$ |
| P2 | 2 | 2 | $x_{p2}, y_{p2}, z_{p2}$ |
| P3 | 3 | 2 | $x_{p3}, y_{p3}, z_{p3}$ |
| P4 | 4 | 3 | $x_{p4}, y_{p4}, z_{p4}$ |
| P5 | 5 | 4 | $x_{p5}, y_{p5}, z_{p5}$ |
| P6 | 6 | 5 | $x_{p6}, y_{p6}, z_{p6}$ |
| . | . | . | . |
| . | . | . | . |
| . | . | . | . |
| Pn | n | N | $x_{pn}, y_{pn}, z_{pn}$ |

The colored image 1 can also be represented on a color monitor, and the color test points can be obtained or pinpointed by a cursor and a suitable measurement circuit. For this purpose, the colored image 1 is scanned by means of a television camera. In the case that the colored image 1 has already been scanned by means of a color scanner, and where the digitized color information has been stored in an image memory, the appropriate color information is stored in an image refresher memory, and is cyclically read out for display on the color monitor.

OBTAINING OF THE COLOR NUMBERS

Following the already described first step of extracting color test points, those color zones, which correspond to a test point color have already been assigned color numbers. Subsequently, each further color zone ($x_i$, $y_i$, $z_i$) is assigned a color number of the spatially closest test point color zone ($x_{pn}$, $y_{pn}$, $z_{pn}$). So as to determine the appropriate color number, it is required to determine and/or calculate the distance in the color space between a color zone to be assigned a number, and the individual test point color zones, as well as to determine the smallest distance between a respective color zone and its nearest test point.

Figure 4:
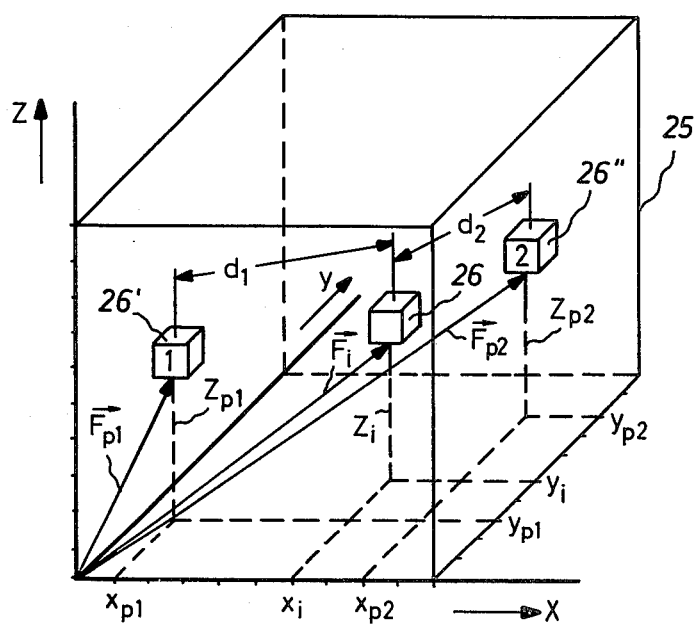
FIG. 4 is a graphic representation of how distances between individual color zones are determined.

This is illustrated further in FIG. 4, which shows the chrominance-luminance color space 25 with a color zone 26, which is to be assigned a color number. The color zone 26 is defined by the spatial vector $\vec{F}_i$ or the trichromatic color coordinates $x_i$, $y_i$ and $z_i$. FIG. 4 shows further two test point color zones 26' and 26'', which are represented by spatial vectors $\vec{F}_{p1}$ and $\vec{F}_{p2}$, or the color coordinates ($x_{p1}, y_{p1}, z_{p1}$) as well as ($x_{p2}, y_{p2}, z_{p2}$). The test point color zones 26' and 26'' are spaced from the color zone 26 to be assigned a color number by respective distance differences $d_1$ and $d_2$. Let the test point color zone 26' be assigned a color number "1", and the test point color zone 26'' be assigned the color number "2".

The $d_n$ of a color zone ($x_i$, $y_i$, $z_i$) to a test point color zone ($x_{pn}$, $y_{pn}$, $z_{pn}$) is determined according the the vectorial equation:

$$d_n = \sqrt{(x_i - x_{pn})^2 + (y_i - y_{pn})^2 + (z_i - z_{pn})^2} \quad (1)$$

In the example shown, the distances $d_1$ and $d_2$ are determined and compared to one another. As $d_2 < d_1$, the color zone 26 is assigned a color number "2". In the event a called-up color zone is spaced from several test point color zones at the same distance, a majority decision can be taken, by assigning the called-up color zone that color number, which most frequently occurs in the test point color zones equidistant from the called-up color zone.

To ascertain the color number of an actual color zone, it is also possible to interrogate the color zones surrounding the color zone to be assigned a color number, at successively increasing distances, and to test the surrounding color zones, as to whether they have been assigned a color number. The color zone for which a color number is to be determined is then assigned a color number, which is first encountered when interrogating its surrounding zones.

Ascertaining of the color numbers and filling of the color recognition memory 28 is accomplished in the circuit shown in FIG. 1 as follows:

The operator actuates an operating key 47 denoted as "fill memory" in the operating region 35' of the input stage 35, so that an order passes through the lead 48 to the address control stage 37.

The address control stage 37 then calls up the color coordinates $x_i$, $y_i$ and $z_i$ of a color zone or address location to be assigned a color number, and transmits these color coordinates via a data bus 49, and the data input 50, to the processing or calculating stage 38.

The address control stage 37 additionally calls up via an address input 41 of the test point memory the first address location of the test point memory 36, in which there are stored the test point color coordinates $x_{p1}$, $y_{p1}$ and $z_{p1}$, as well as the associated color number of the first line of the roster of test points, or test point colors, and transfers these values via the data buses 51 and 52 to the data inputs 53 and 54 of the processing or calculating stage 38.

The processing stage 38 then determines the distance $d_1$ according to the aforenoted equation (1), and stores the so determined value in an internal register.

The address control stage 37 then calls up a second address location of the test point memory 36 with the request to provide data for a second test point to the processing stage 38, which now determines the distance $d_2$ and stores the same. This process terminates upon calculating or determining the $d_n$ to the $n^{th}$ color test point, while simultaneously the smaller distance $d_{min}$ from the corresponding color zone to the spatially nearest test point has also been determined.

The color coordinates $x_i$, $y_i$ and $z_i$ called-up by the address control stage 37 simultaneously call-up the corresponding addresses of the color recognition memory 28 via an address bus 55 and the switch 33, which is now in the position shown in full lines. The color number, which is associated with the above-noted smallest distance $d_{min}$ from the appropriate color zone to an appropriate test point, is then transferred from the processing stage 38 via a data bus 56, a further switch 57, and a data input 30 to the color recognition memory 28, using the selected address location.

Subsequently, the address control stage 37 calls up the color coordinates, or addresses of a test color zone or address location to be assigned a color number, and the color numbers are obtained, and transcribed to the color recognition memory 28 as has been described above.

The address control stage 37 can call-up addresses of the color recognition memory 28 in an arbitrary manner, or may limit it to a certain region, if only one or several color recognition regions are to be obtained and appropriately limited.

Selection and limiting of one or several color recognition regions to a predetermined minimum number of color zones is adequate, if the color image scanned is, for example, a control mask, and if only a few mask signals are to be obtained, or if the output signals of the color recognition memory 28 are to be used for selective color correction only. In all other cases, it is mostly advantageous if the address locations of the color recognition memory 28 are made use of fully, as no undefined color state can then take place, and color separation can be accomplished at a high reliability of color recognition. In such a case, it is advantageous, to call-up the addresses of the color recognition memory line by line.

A further advantageous operation of the circuit of FIG. 1 is as follows:

If, for example, a surface of the color image 1, which has one or several colors running into one another, is to be recognized as a single color only, and denoted with the color number "N", it is additionally possible to let the scanner 8 pass in closely spaced motions over the respective surface, so as to encompass as many trichomatic color coordinates x, y and z of the corresponding surface. In this mode of operation, the switches 33 and 57 are in the dotted positions, and the color coordinates select the appropriate addresses of the color recognition memory directly. Simultaneously with the motion of the scanner 8, the operator inputs with the aid of the decade-type key arrangement provided in the input stage 35, the color number "N", which is then stored via a data bus 58, the switch 57, and the data input 30 in all called-up addresses in the color recognition memory 28. The totality of the storage locations assigned the color number "N" then forms the color recognition region for the individual color to be recognized.

It is, of course, possible to also fill the color recognition memory 28 by extracting only an adequately large number of color test points from the color image 1.

The afore-described process has the key advantage, that as a result of the selection of the color test points in the color image, the magnitude, shape and orientation of the color recognition regions within the color space can be influenced. The color recognition regions can therefore be optimally matched to the color ranges to be separated, which in turn results in a high reliability of recognizing colors. The color recognition regions are therefore not predetermined in a rigid manner, but may be individually matched to the color image to be scanned by extraction of the corresponding test points. Thus, only that number of color recognition regions is provided as is necessary to separate colors occurring in the colored image from one another.

Figure 5:
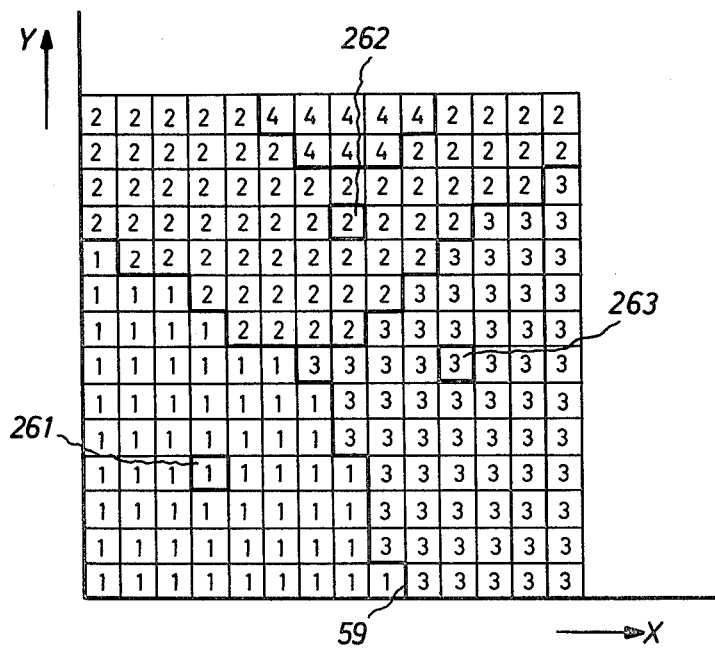
FIG. 5 is a section through the chrominance-luminance color space, showing the separate color recognition regions and the individual color zones.

To represent the afore-described processes, there is shown in FIG. 5 in section a chrominance plane (z=constant) through the chrominance-luminance color space. During test point extraction, the color zones 261, 262 and 263 were assigned the color numbers "1", "2" and "3", respectively. Following the afore-described ascertainment of the color numbers, and filling of the color recognition memory 28, all color zones in this chrominance plane have been assigned color numbers. Three color recognition regions have been formed around the test point color zones 261, 262 and 263, which are separated by lines 59 from one another.

Summarizing then, in a method of determining the intensity of a plurality of colors on a colored image, with the aid of a light source of known spectral composition which includes a known number of colors, and wherein the image includes a multiplicity of color ranges, the steps comprises: illuminating the colored image with the light source, selecting a number of test points on the colored image, each test point having a test point color, photoelectrically scanning the colored image, thereby deriving the intensity of each illuminated color range, and of each illuminated test point color, by light reflection from, or light transmission through the image, measuring the derived intensity of each color range and of each test point color, representing the so measured intensities of each color range as color locations in a color space that has a predetermined number of separate color recognition regions, assigning each color location spatial coordinates in the color space, memorizing the measured intensity of each test point color, at least one separate test point being associated with each color recognition region, assigning an identification symbol in terms of the spatial coordinates to each memorized test point color, comparing the measured intensity of each color range with the memorized test point color, within a corresponding of the separate color ranges, and upon coincidence of the memorized test point color with the measured intensity of a corresponding area color, assigning to the so compared intensity of the measured color range an identification tag corresponding to the identification symbol. It is convenient to assign numerals to both identification symbols and identification tags, the numerals for the identification symbol being identical with corresponding numerals for the identification tag.

Alternately, in a method of determining the intensity of a plurality of colors on a colored image with the aid of a light source of known spectral composition, which has a known number of colors, the image including a multiplicity of color ranges, the steps comprise: illuminating the colored image with the light source, selecting a preset number of test points on the colored image, each test point having a test point color, photoelectrically scanning the colored image, thereby deriving the intensity of each illuminated color range, and of each illuminated test point color, by light reflection from, or light transmission through the image, measuring the derived intensity of each color range and of each test point color, representing the so measured intensities of each color range as color locations in a color space, that has a predetermined number of separate color recognition regions, assigning each color location spatial coordinates in the color space, the preset number of test points corresponding to the predetermined number of separate color recognition regions, memorizing the measured intensity of each test point color, at least one separate test point being associated with each recognition region, assigning an identification symbol in terms of the spatial coordinates to each memorized test point color, and assigning to each color location an identification tag having coordinates corresponding to the coordinates of a thereto spatially nearest identification symbol.

It is further advantageous to number each identification tag, select a color location, determine a vectorial distance of the selected color location from each test point, select a test point spatially nearest to the selected color location, and to subsequently assign a numbered identification tag which has spatial coordinates corresponding to a thereto spatially nearest identification symbol.

FIG. 6 shows a second implementation example for a circuit for recognizing colors, which differs from the circuit of FIG. 1 by a different implementation of the color intensity processor 34'.

The color intensity processor 34' includes again an input stage 35, a test point memory 36, address control stage 37, a modified processing or calculating stage 38', and additionally, a shell memory 62, and OR gate 63. The operation of the color intensity processor 34' will be explained below.

The extraction of test points corresponds to the method already described in relation to FIG. 1, so that the steps of filling the color recognition memory 28 will be described in what follows.

FILLING OF THE COLOR RECOGNITION MEMORY

Following extraction of the test points, color numbers have already been assigned to these color zones to which a test point number corresponds (test point color zones). Starting with the test point color zones, the color recognition regions are built up from the individual color zones, the associated color numbers are obtained, and the so obtained color numbers are stored in the color recognition memory 28.

The color recognition regions are extended within the chrominance-luminance color space, according to the present invention, so as to assume substantially the shape of a cube or a sphere, by surrounding individual test point colors or test point color zones with spherical shells or shells shaped in the form of a cube at successively increasing distances. The color zones used as building blocks for the spherical or cube-shaped shells, are also simultaneously tested whether a color number has been assigned to them during extraction of a test point. In the case that a color zone so examined or tesed has not yet been assigned a color number, it will be assigned the color number of its associated central test point color zone. If, however, the color zone to be examined has already been assigned a color number, the expansion of the color recognition region at this point is interrupted. In the example discussed, spherical shells are employed.

These processes will be explained in detail as follows:

Construction of Spherical Shells

The individual spherical shells laid around the color test points are approximated by corresponding color zones. The spatial vectors $F_{sm}$ of the color zones or their shell coordinates $x_{sm}$, $y_{sm}$ and $z_{sm}$, referred to an auxiliary coordinate system having as an origin the corresponding color test point, participating in the formation of the spherical shells, have already been determined prior to the color recognition proper, and have been stored in the shell memory 62 shell by shell in the form of a list of successive shells.

The shell boundary coordinates $x_{sm}$, $y_{sm}$ and $z_{sm}$ satisfy the general spherical vectorial equation:

$$r_m = \sqrt{x_{sm}^2 + y_{sm}^2 + z_{sm}^2} \qquad (2)$$

having a radius $r_1 = \sqrt{1}$ for the first shell, a radius $r_2 = \sqrt{2}$ for the second spherical shell, a radius $r_3 = \sqrt{3}$ for the third spherical shell, and in general, having a radius $r_m = \sqrt{m}$ for the $m^{th}$ spherical shell.

The sum total of all trichomatic integers, which satisfy this spherical equation having a predetermined radius $r_m$, namely whose quadratic sum is equal to $r_m^2$, form the shell coordinates $x_{sm}$, $y_{sm}$ and $z_{sm}$ of the color zones associated with the $m^{th}$ spherical shell. Starting with at least one representative, an ordered shell coordinate triple value for the $n^{th}$ spherical shell, all remaining shell coordinates $x_{sm}$, $y_{sm}$ and $z_{sm}$, are obtained by permutation and sign reversal.

Figure 7:
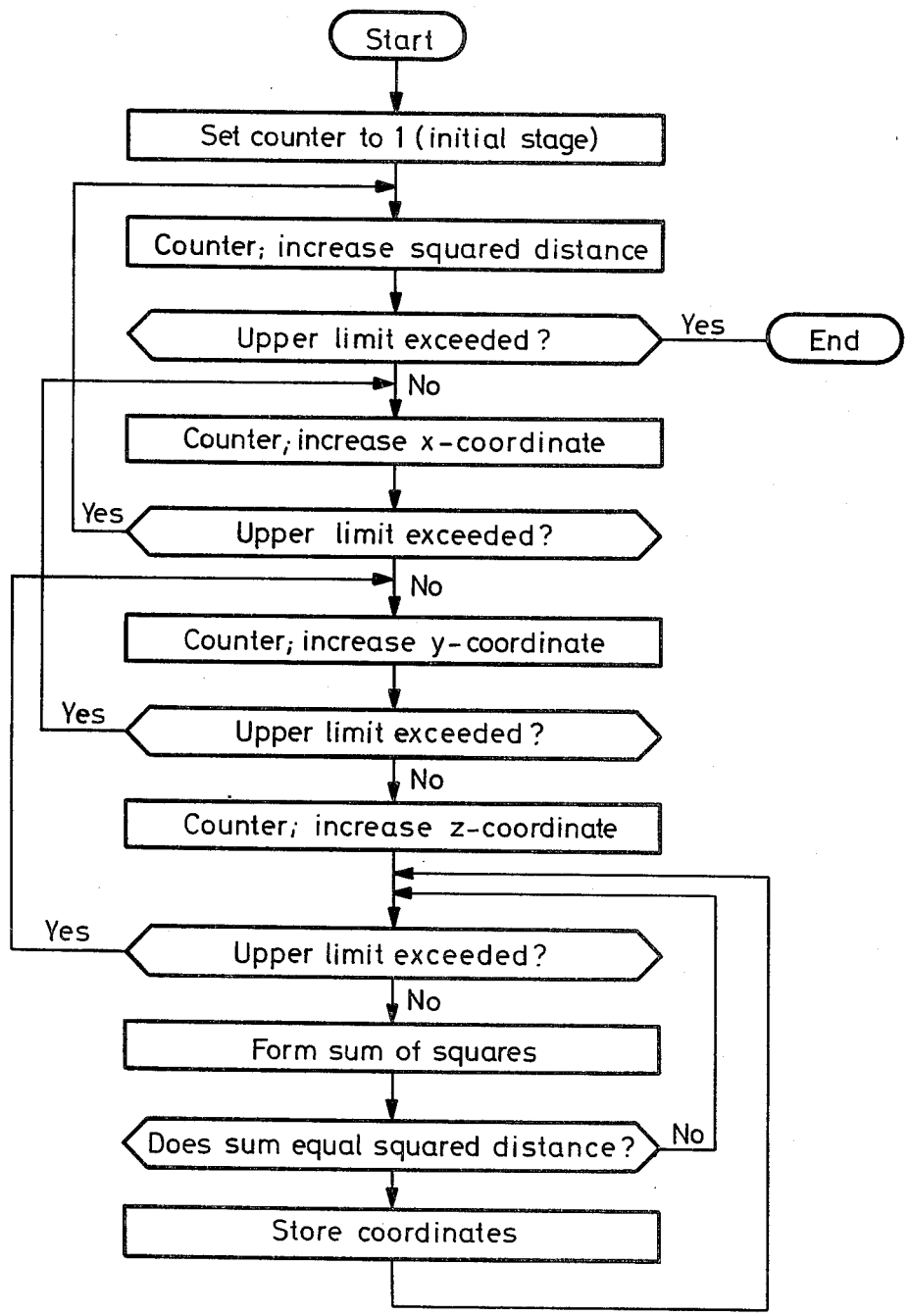
FIG. 7 shows a flow diagram for determining shell-coordinates.

The obtaining of shell coordinates with the aid of digital counters, which is explained in FIG. 7 by means of a flow diagram, is accomplished, for example, as follows:

Zeroth Sphere ($r_0 = 0$)

This shell corresponds to a test point color zone having test point color coordinates $x_{pn}$, $y_{pn}$ and $z_{pn}$. The shell coordinates are equal to 0.

First Sphere ($r_1 = 1$)

Representative triple value of shell coordinates: (0,0,1).

Shell coordinates: (0,0,1); (0,1,0); (1,0,0); (−1,0,0); (0,−1,0); (0,0,−1).

Second Spherical Shell ($r_2 = \sqrt{2}$)

Representative spherical triple value of shell coordinates: (0,1,1).

Shell coordinates: (0,1,1); (1,0,1); (1,1,0); (0,1,-1); etc.

Third Spherical Shell ($r_3 = \sqrt{3}$)

Representative spherical shell coordinate triple value: (1,1,1).

In an analogous way, appropriate shell coordinates result therefrom.

FIG. 8 shows the formation of the first three spherical shells made up of color zones 26 in spatial representation.

Figure 8A:
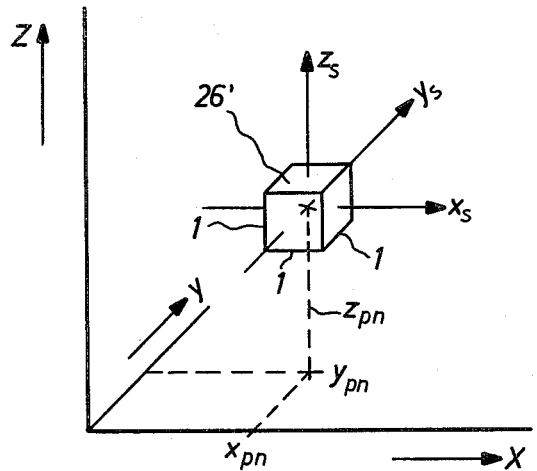
FIGS. 8a through 8d illustrate the formation of shells.
Figure 8B:
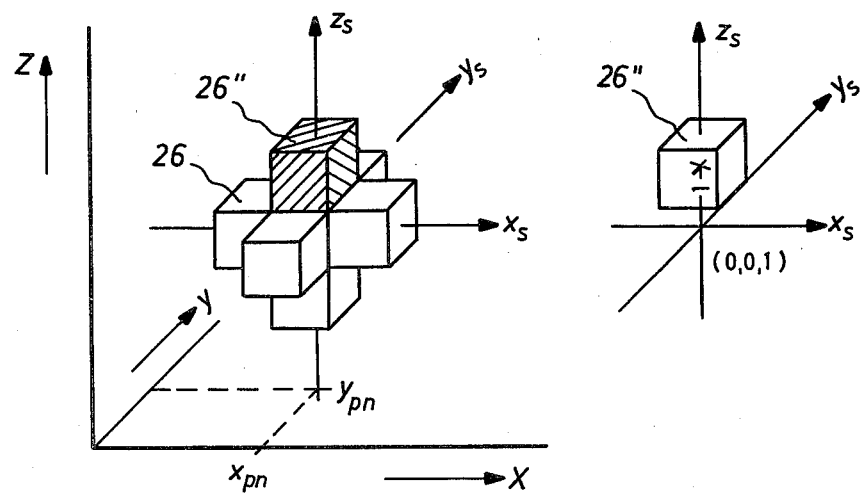
Figure 8C:
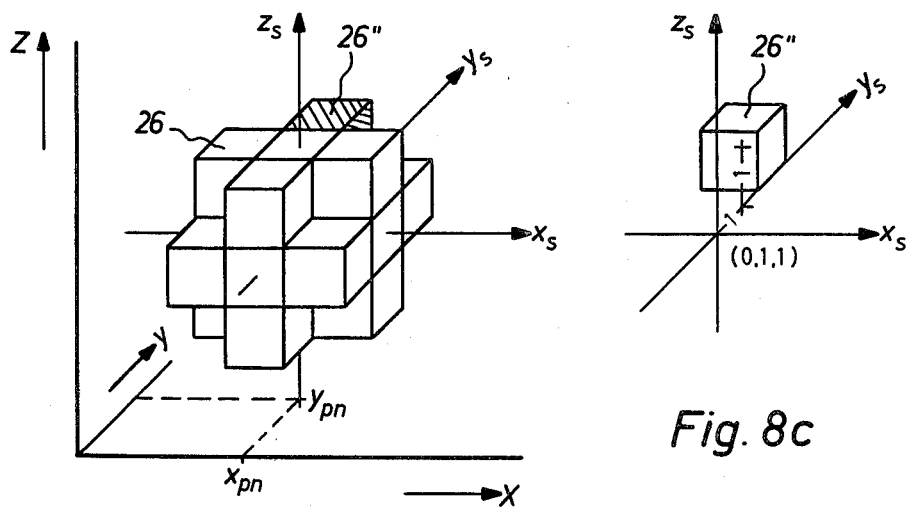
Figure 8D:
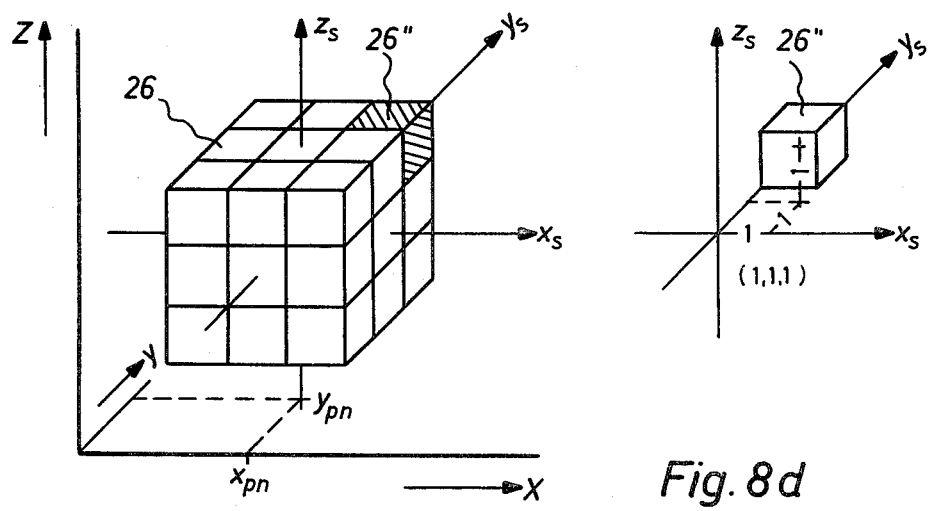

In FIG. 8a, there is shown a test color zone 26', in FIG. 8b, there are shown the color zones 26 of the first spherical shell surrounding the test point color zone 26'', in FIG. 8c, there are additionally shown the color zones 26 of the second spherical shell, and FIG. 8d, there are shown additional color zones 26 of a third shell. Simultaneously, there is always shown the representative color zone 26'' and its shell coordinates.

Obtaining of the Color Coordinates (addresses $x_i, y_i, z_i$)

The color coordinates $x_i$, $y_i$ and $z_i$ of the color zones 26 participating in the formation of spherical shells around a color test point in a chrominance-luminance color space or the corresponding addresses or address locations of the color recognition memory 28 are obtained from the shell coordinates $x_{sm}$, $y_{sm}$ and $z_{sm}$, and the test point color coordinates $x_{pn}$, $y_{pn}$ and $z_{pn}$ according to the vectorial equations:

$$x_i = x_{pn} + x_{sm} \quad (3)$$
$$y_i = y_{pn} + y_{sm}$$
$$z_i = z_{pn} + z_{sm}$$

Figure 9:
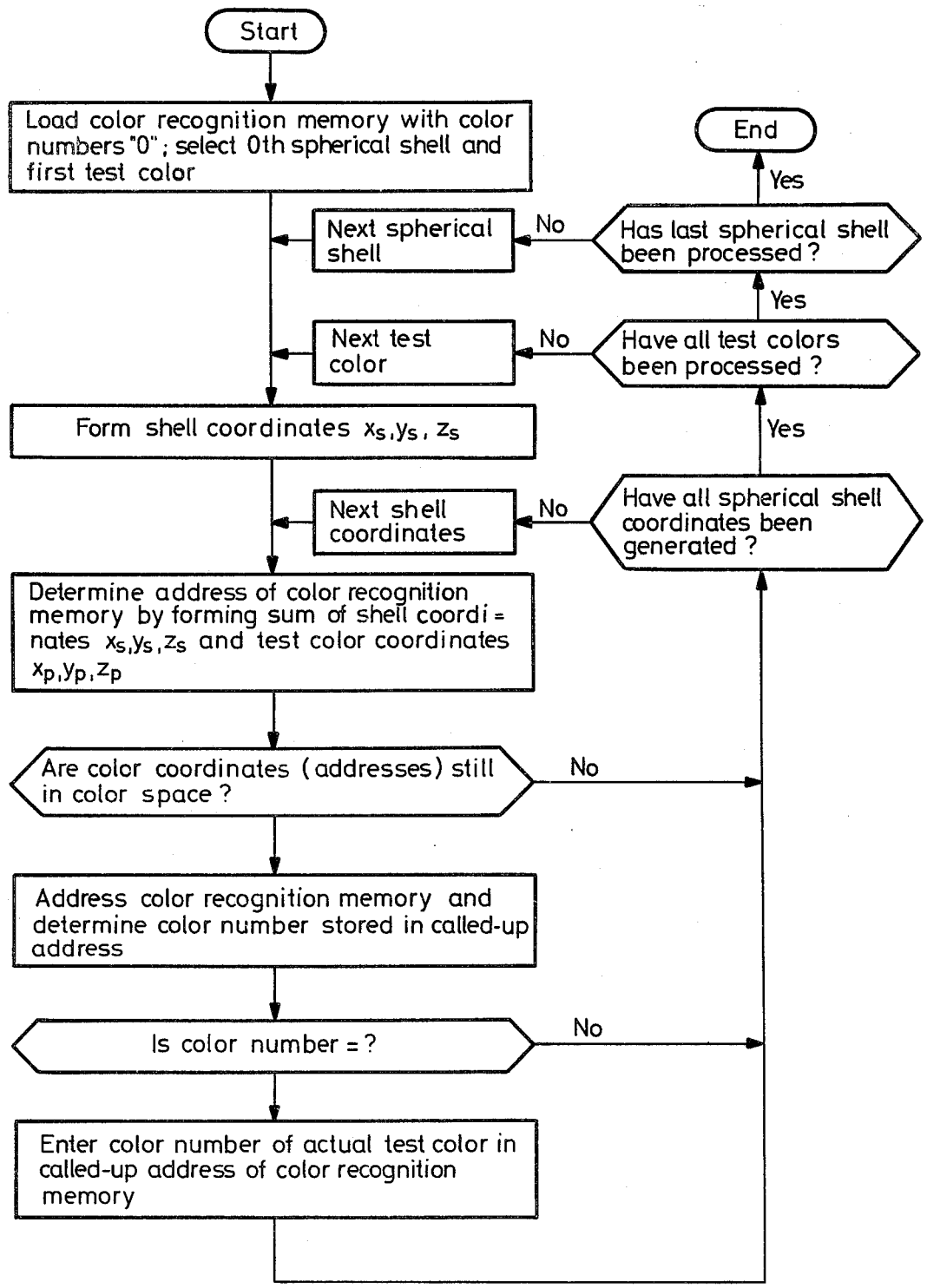
FIG. 9 is a flow diagram illustrating the operation of the circuit shown in FIG. 6.

The determination of the individual triple value color coordinates is accomplished in succession, by successively surrounding each color test point by a first spherical shell, subsequently each color test point by a second spherical shell and so forth. This process is shown in the flow diagram according to FIG. 9.

The storing of color numbers in the address- or storage-locations of the color recognition memory 28 is started by actuating the key 47 denoted as "filling memory", as a result of which an appropriate command is fed via a lead 48 to the address control stage 37 and to the calculating or processing stage 38'. This results in all storage- or address-locations of the color recognition memory 28 having stored therein color numbers "0".

The address control stage 37 is connected to the test point memory 36 and to the shell memory 62 via address buses 41 and 64, respectively. The shell coordinates $x_{sm}$, $y_{sm}$ and $z_{sm}$ are transcribed via a data bus 65, the test point coordinates $x_{pn}$, $y_{pn}$ and $z_{pn}$ via a data bus 52, and the associated color numbers via a data bus 51, to the calculating or processing stage 38'. From the transcribed coordinates, there are ascertained the color coordinates $x_i$, $y_i$ and $z_i$ in the calculating or processing stage 38' according to the equations (3), the color coordinates $x_i$, $y_i$ and $z_i$ calling out the appropriate addresses or address locations of the color recognition memory 28, via the address bus 55, the switch 33 and the address input 29.

First the shell lists of the zeroth spherical shell ($x_s = y_s = z_s = 0$) and the entire roster of test points is fed line by line into the processing stage 38'. In this case, the so determined color coordinates $x_i$, $y_i$ and $z_i$ are equal to the test point color coordinates $x_{pn}$, $y_{pn}$ and $z_{pn}$ of the individual color test points, and in the color recognition memory 28, the color numbers associated with the corresponding test points are stored in the called-up address locations. These color numbers are fed to the color recognition memory 28 from the processing stage 38' via the data bus 56, the OR gate 63, the switch 57, and the data input 30.

In the next step, the shell list for the first spherical shell is fed to the processor 38', and the list or roster of test points is worked over line for line again, the color coordinates $x_i$, $y_i$ and $z_i$ of the first shell being successively determined around each color test point. These color coordinates again address the color recognition memory 28. Simultaneously, each addressed storage location is tested again as to whether a color number has already been assigned to it. For this purpose, OR gate 63 is connected to the data output 31 of the color recognition memory 28 via a data lead 66. If a color number has been assigned to the corresponding address location, the appropriate OR gate 63 is inhibited, so that it is no longer possible to write in a color number via the data bus 56 to the color recognition memory 28. If, however, the corresponding color zone has not been assigned a color number, the corresponding OR gate 63 is open, and allows the signal to pass, and the color number of the corresponding test point color is stored in the respective address location called up, around which test point color a spherical shell is just being formed.

Thus, each test point color is surrounded by an increasing number of spherical shells, until one or several color recognition regions, or the whole color space has been assigned appropriate color numbers.

The filling of the memory, and the expansion of the individual color recognition regions around respective color test points can be terminated arbitrarily, or according to certain criteria.

The reaching of a predetermined shell radius may, for example, be used as a criterion for terminating the formation of the shells, or an alternate criterion may be the establishment of contact of shells of respective neighboring or adjacent test point colors. Still another criterion may be the dependence of the shell radius on a number of the color test points to be determined, which can be an alternate criterion for terminating the expansion of the color recognition region. The expansion of the color recognition region proceeding at the predetermined rate, may alternately be terminated in dependence of a minimum frequency of encountering color zones already assigned a color number during the formation of the spherical shells. A section of a completely filled memory is again shown in FIG. 5.

It is, of course, possible to fill the color recognition memory 28 by extracting only an adequately large number of color test points from the colored image, as has been explained when discussing FIG. 1, or if the scanner interrogates the corresponding surface, and if the color number "N" is selected via the decade key system.

The method described has the additional advantage that the magnitude, shape and orientation of the color recognition regions within the color space can be influenced by the choice of the color test points in the colored image. Thus, the color recognition ranges can be optimally matched to the color regions to be separated from one another, which in turn results in a high reliability of recognition.

Summarizing then, in a second method of determining the intensity of a plurality of colors on a colored imaged with the aid of a light source of known spectral composition, which includes a known number of colors, the image including a multiplicity of color ranges the steps comprise: illuminating the colored image with the light source, selecting a number of test points on the colored image, each test point having a test point color, photo-electrically scanning the colored image, thereby deriving the intensity of each illuminated area color, and of each illuminated test point color, measuring the derived intensity of each color range and of each test point color, representing the so measured intensities of each color range as color locations in a color space, that has a predetermined number of separate color recognition regions, assigning each color location spatial coordinates in the color space, memorizing the measured intensity of each test point color, at least one separate test point being associated with each color recognition region, assigning an identification symbol in terms of the spatial coordinates to each memorized test point color, surrounding each test point color with selected color locations, so as to form successive shells, calling up the selected color locations shell by shell at successively increasing distances from a respective test point color, assigning to the called up color location an identification tag corresponding to the identification symbol of a corresponding memorized test point color, and reading out the identification tags corresponding to the respective color locations.

It is further advantageous to test a chosen color location as to whether an identification tag has been assigned to it, and, if no identification tag has been assigned to the chosen color location, to assign an identification tag to the chosen color location corresponding to the identification symbol of the corresponding memorized test point color.

Figure 10:
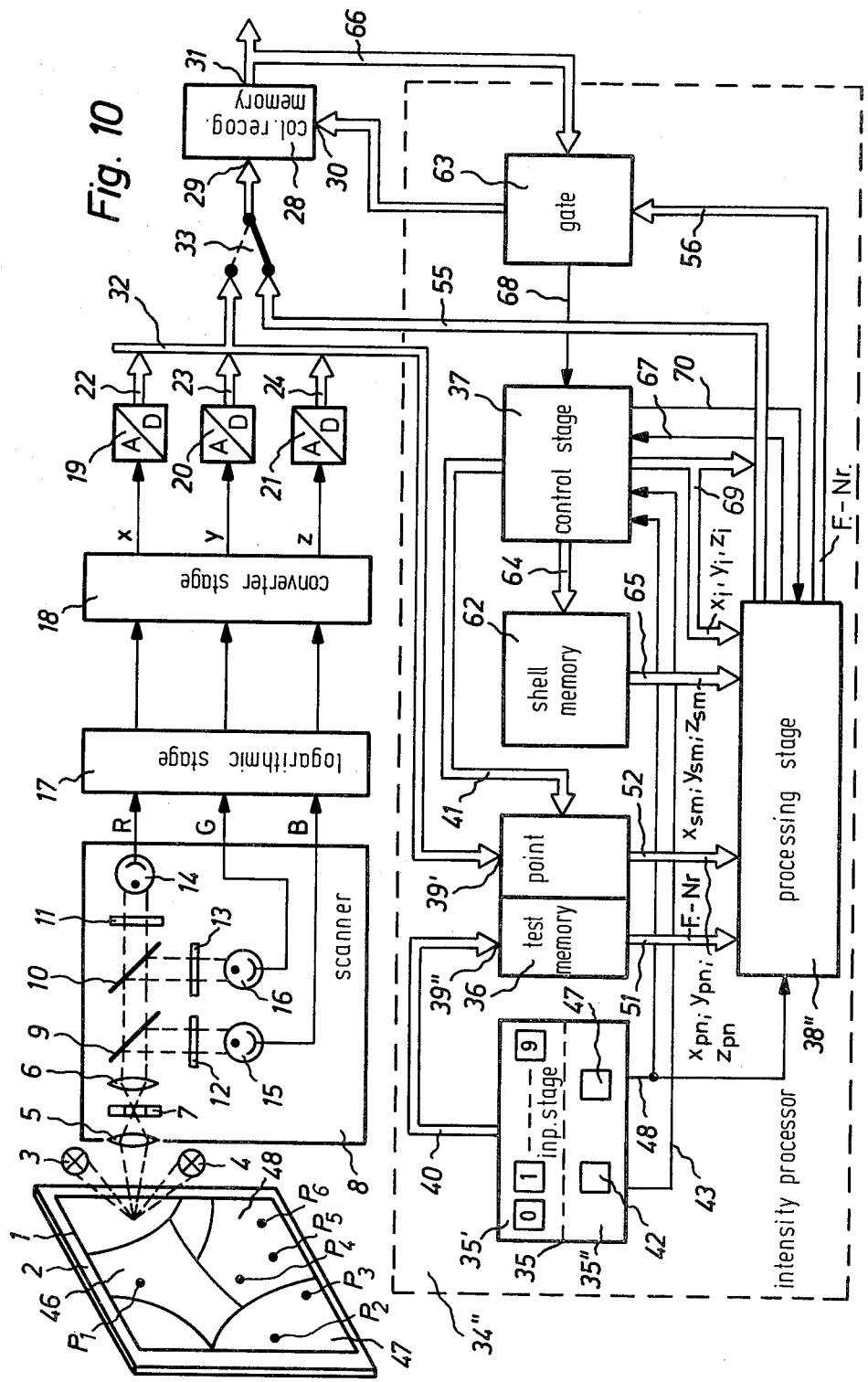
FIG. 10 shows a third version of the circuits for recognizing colors.

FIG. 10 shows a third embodiment of a circuit for recognizing colors, which combines the advantages of the process illustrated in FIGS. 1 and 6 for filling the color recognition memory.

In this alternate method, the color intensity processor 34" combines the functional stages of the color intensity processor shown in FIG. 1, and the color intensity processor 34' shown in FIG. 6.

The color intensity processor 34" again includes the input stage 35, the test point memory 36, the shell memory 62, the address control stage 37, a modified calculating or processing stage 38", and the OR gate 36.

The operation of this embodiment is as follows:

The test points, or test point colors, are again extracted from the color image 1, as has been described in FIG. 1, so that in what follows the filling of the color recognition memory 28 will be described.

Determining the Color Numbers

This process is accomplished in two separate phases.

In the first phase (prefilling), the color recognition regions extend around the individual test point color zones, as has been described with respect to FIG. 6, in the form of spherical-shaped or cube-shaped shells. The corresponding color zones (color locations) which surround the test points or test point colors in the form of shells, are called up shell by shell at respectively increasing distances, and examined whether a color number has been assigned to them during extraction of the color-test points or not.

In the case that a color zone called up and tested has not been assigned a color number, that color zone is assigned the color number of its associated central test color zone. The formation of the spherical shells has already been described in detail with the aid of FIGS. 6, 7, 8, and 9.

The formation of the shell is terminated at the start of the second phase.

In the second phase, those color zones to which no color numbers have been assigned yet, according to the method described with the aid of FIG. 1, are assigned the color numbers of those test points, or test point colors, disposed spatially nearest to the respective color zone within the color space.

The filling of the color recognition 28 is then terminated.

A. Pre-Filling of the Color Recognition Memory.

In the next step, the shell for the first spherical shell is fed to the calculating or processing stage 38", and the roster of test point, or test point colors, is processed anew, the color coordinates $x_i$, $y_i$, and $z_i$ of the first spherical shell being successively determined around each test point or test point color. The color coordinates again address the color recognition memory 28. Simultaneously, each address storage location is tested, whether a color number has already been assigned to it.

If a color number has already been assigned thereto, the appropriate OR gate 63 is blocked or inhibited, so that it is no longer possible to write in a color number to the color recognition memory 28 via the data bus 56. If, however, no color number has been assigned to the corresponding color zone, the corresponding OR gate 63 is open or processes a signal, and the color number of a corresponding test point or test point color is stored in the respective called up address, around which test point or test point color a spherical shell is being formed.

In this manner, the individual test points or test point colors are surrounded by an increasing number of spherical shells, until the spherical shell formation is terminated. For termination of the shell formation, the criteria shown in FIG. 9 can again be used.

Following termination of the formation of spherical shells, the individual color recognition zones in the color space have been expanded, but not all color zones have yet been assigned color numbers.

B. Filling The Remainder of the Color Recognition Memory.

Filling of the remainder of the color recognition is accomplished by assigning all color zones having color components $x_i$, $y_i$, and $z_i$ those color numbers of the spatially nearest test color zones (n) having color components $x_{pn}$, $y_{pn}$, and $z_{pn}$, following termination of the shell formation.

In order to determine the color numbers, it is again necessary to determine the distance in a color space between a color zone to be assigned a color number, and the individual test point color zones, and also to determine the smallest distance between respective color zones, and the nearest test point or test point color. This method, which has been already described in detail with the aid of FIGS. 1, 2, and 4, proceeds as follows:

Reaching of a predetermined shell radius is used in the embodiment described as an example for a criterion leading to determination of the shell formation. This shell radius is marked on the roster or list of test points or test point colors stored in the test point memory 36. If this shell radius is encountered during processing of the roster of test points or test point colors, the processing stage 38" gives an order via the lead 67 to terminate the formation of shells to the address control stage 37.

The address control stage 37 calls up line-by-line all color coordinates $x_i$, $y_i$, and $z_i$, or the corresponding address locations of the color recognition 28, via the address bus 55, the switch 33, and the address input 29. Simultaneously, the called up storage locations are tested, whether or not a color number has been assigned to them, by reading out the corresponding color numbers from the color recognition memory 28 via the data bus 66, and the corresponding OR gates 63. If an address location having stored therein the color number "zero" is encountered, then the corresponding OR gate 63 issues an order "not assigned" (not occupied or available) which is fed via a lead 68 to the address control stage 37.

The address control stage 37 interrupts the calling up of addresses and marks the corresponding address of the storage location, to which there has not yet been assigned a number.

The selected color components ($x_i$, $y_i$, and $z_i$) are transferred from the address control stage 37 via a further data bus 69, to the calculating or processing stage 38". The address control stage 37 activates the processing state 38" by an order "distance determination" on a lead 70, and additionally calls up, via an address bus 41, the first address of the test point memory 36, in which there are stored the test point color coordinates $x_{p1}$, $y_{p1}$, $z_{p1}$, as well as the associated color number of the first test point or test point color (first line of the roster of test points). The called up values of the roster of test point colors is transferred via data buses 51 and 52 into the processing stage 38".

The processing stage 38" now determines the distance d according to equation (1), and stores the so-determined value in an internal register.

Then, the address control stage 37 calls up the second address of the test point memory 36, and adds to the second line of the roster of test points, data concerning the second test point or test point color, which data are fed to the processing stage 38", which then determines the distance $d_2$ and stores the distance. This process is concluded upon calculating the distance $d_2$ at the nth test point color, and simultaneously there is determined the smallest distance $d_{min}$ of the appropriate color to the spatially nearest test point or test point color.

The color number, which is associated with the test point or test point color having the smallest distance from the corresponding color location, is transcribed from the processing stage 38" via the data bus 36, the appropriate OR gate 63, and via the data input 30 into the color recognition memory 28, and is there stored under the appropriately marked address.

Subsequently, the address control stage 37 calls up the next address location of the color recognition memory 28, to which the color number is yet to be assigned, and the above-described processes are repeated, until all gaps of the color recognition memory 28 have been filled. The result of filling of the color recognition memory 28 can be seen from FIG. 5, in which there is shown a section through the color space parallel with the chrominance plane, and having color locations which have all been assigned corresponding color numbers.

Figure 11:
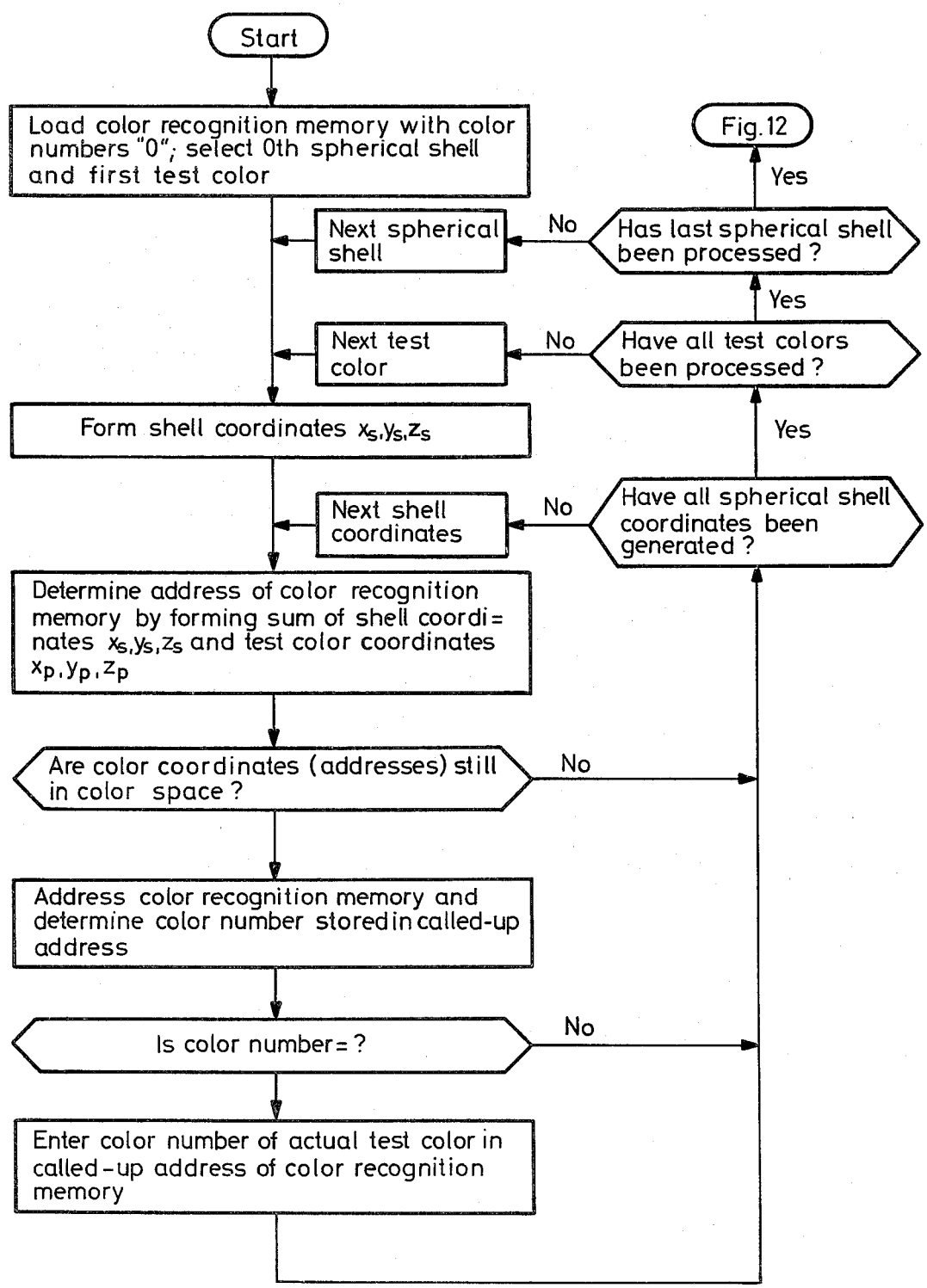
FIG. 11 is a flow diagram showing the operation of the circuit of FIG. 10.
Figure 12:
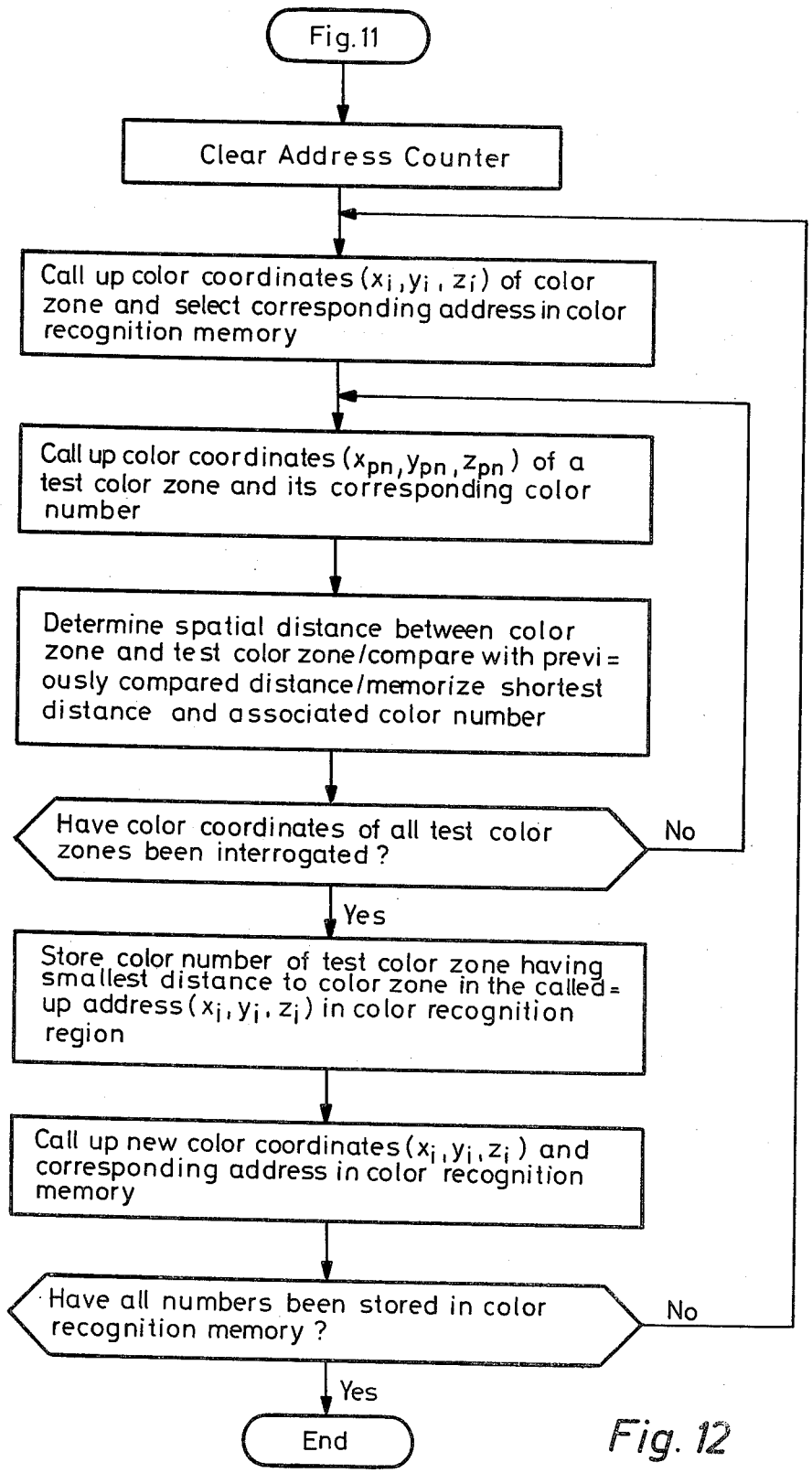
FIG. 12 is a further flow diagram showing the operation of the circuit of FIG. 10.

The operation of the circuit according to FIG. 10 is shown once more according to the flow diagrams of FIGS. 11 and 12. FIG. 11 shows a flow diagram for the pre-filling of the color recognition memory 28, and FIG. 12 the corresponding flow diagram for filling the remainder of the color recognition memory 28.

The combined method of filling the color recognition memory 28 first by means of a pre-filling, and finally, by filling the remainder of the color recognition memory has the advantage that the calculating time in the processing stage 38" is shortened, and that the filling of the color recognition memory 28 proceeds at a much faster pace.

Figure 13:
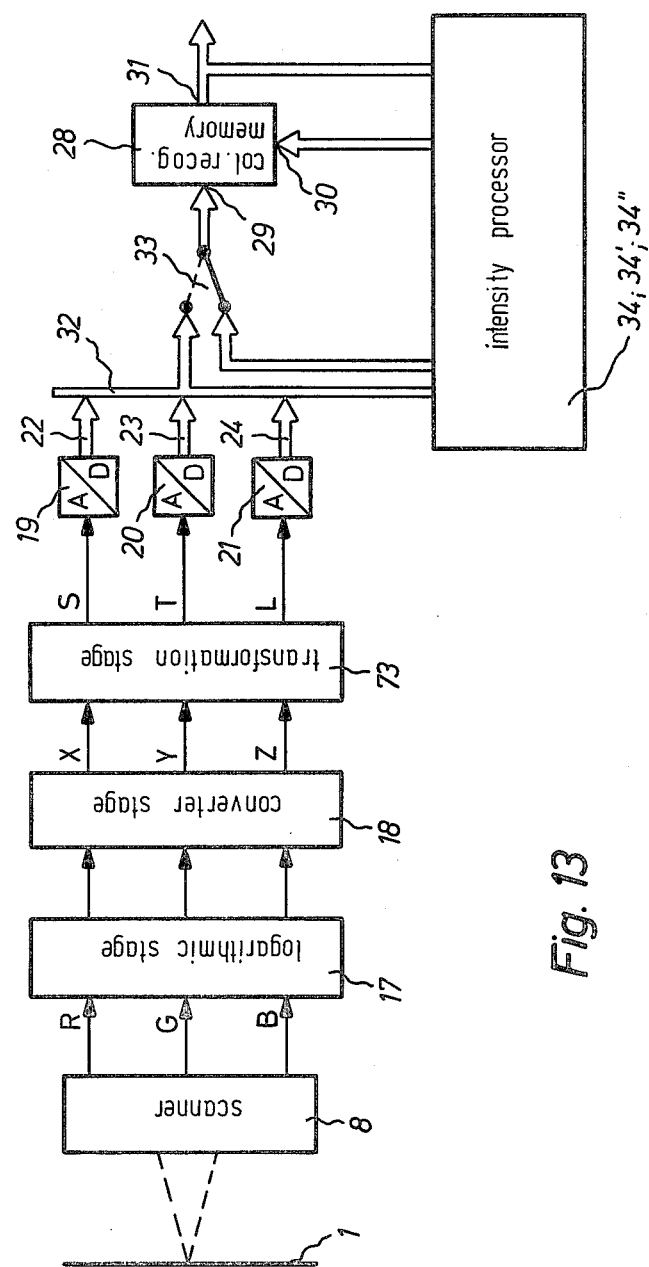
FIG. 13 is another version of the circuit.

FIG. 13 shows a variation of the circuits according to FIGS. 1, 6, and 10, but only a segment thereof is shown.

A further converter stage 73 is post-coupled to the converter stage 18, in which the cartesian color coordinates x, y, z are transformed to the cylindrical color coordinates S, T, and L according to the equations:

$$S = c_1 \sqrt{x^2 + y^2} \quad (S = \text{Saturation})$$

$$T = c_2 \text{ arc tan} \frac{y}{x} \quad (T = \text{Hue})$$

$$L = c_3 \quad (L = \text{Brightness})$$

which corresponds to the transformation of the chrominance-luminance color space into a saturation/hue brightness color space.

All previously described processes are then accomplished with the aid of the color coordinates S, T, and L. By the transformation described, and an appropriate analog-to-digital conversion in the analog-to-digital transducers 19, 20, and 21, it is possible to obtain a much higher resolution in hue than in saturation or brightness, also a much better resolution in weakly saturated colors, and a better separation with respect to complementary colors. This is essentially due to the effect that a formation of color recognition regions is accomplished along preferred directions, which correspond to the physiological sensation of the human eye. These color recognition regions are stretched in the direction of the saturation axis and are compressed in a direction of the hue axis, which permits a better saturation of hues. Stretching and compression of the color recognition regions can be further increased by the choice of the coefficients $c_1$, $c_2$, and $c_3$.

In order to recognize fluctuations or running of one region into another within a color "grey" recognized as a single color "grey", a cylindrical or barrel-shaped color recognition region surrounds the grey axis. The transformation of the color spaces is advantageous also in this case, as a definition of such cylindrical or barrel-shaped color recognition regions is accomplished more easily using the S, T and L color coordinates.

Figure 14:
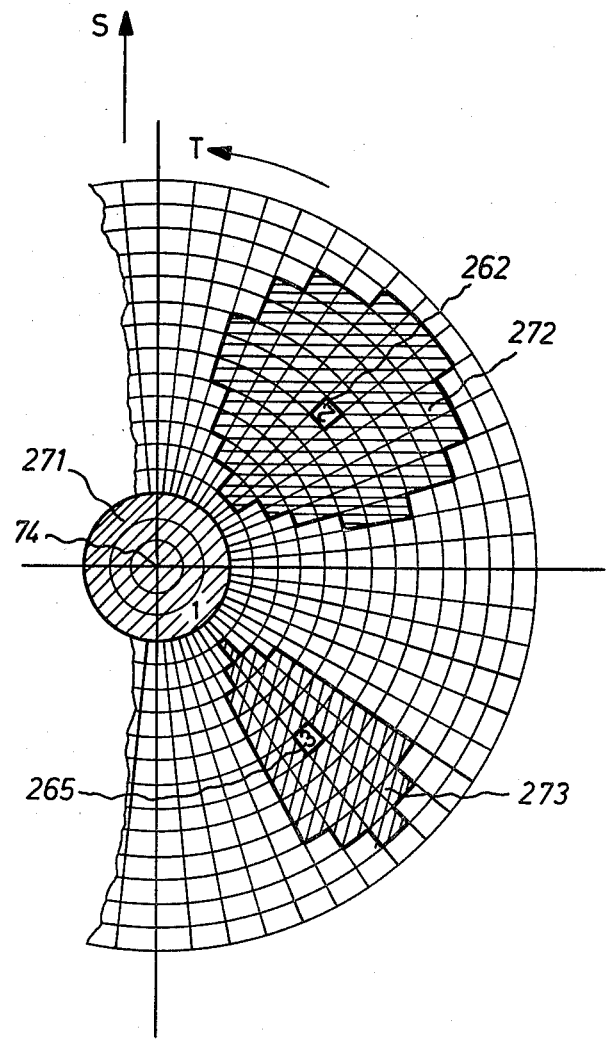
FIG. 14 is a section through a saturation/hue/brightness color space.

FIG. 14 shows a chrominance plane as a section through the saturation/hue/brightness color space. A color recognition region 272 has been formed around the test point color zone 262, which has been assigned the color number "2". The shell-shaped color recognition region in the chrominance-luminance color space has been changed by this transformation into a saturation/hue/brightness ellipsoid-shaped space, whose longitudinal axis is oriented along the saturation axis. Around the test point color zone 253, there has been formed a second color recognition region 273, having assigned thereto the color number "3", which extends in the saturation direction to the same extent as the color recognition region 272, but is compressed in the direction of hue.

Around the grey axis, there has been formed a further color recognition region 271, for "grey" denoted by the point 74, to which has been assigned the color number "1".

It is of course within the scope of the invention to use, instead of the color coordinates x, y, and z, or the color coordinates of S, T and L also the color coordinates R, G, and B of the red, green and blue color space.

In the latter case, no conversions are necessary, and the output signals of the scanner 8, or the logarithmic stage 17, are then further processed.

Figure 15:
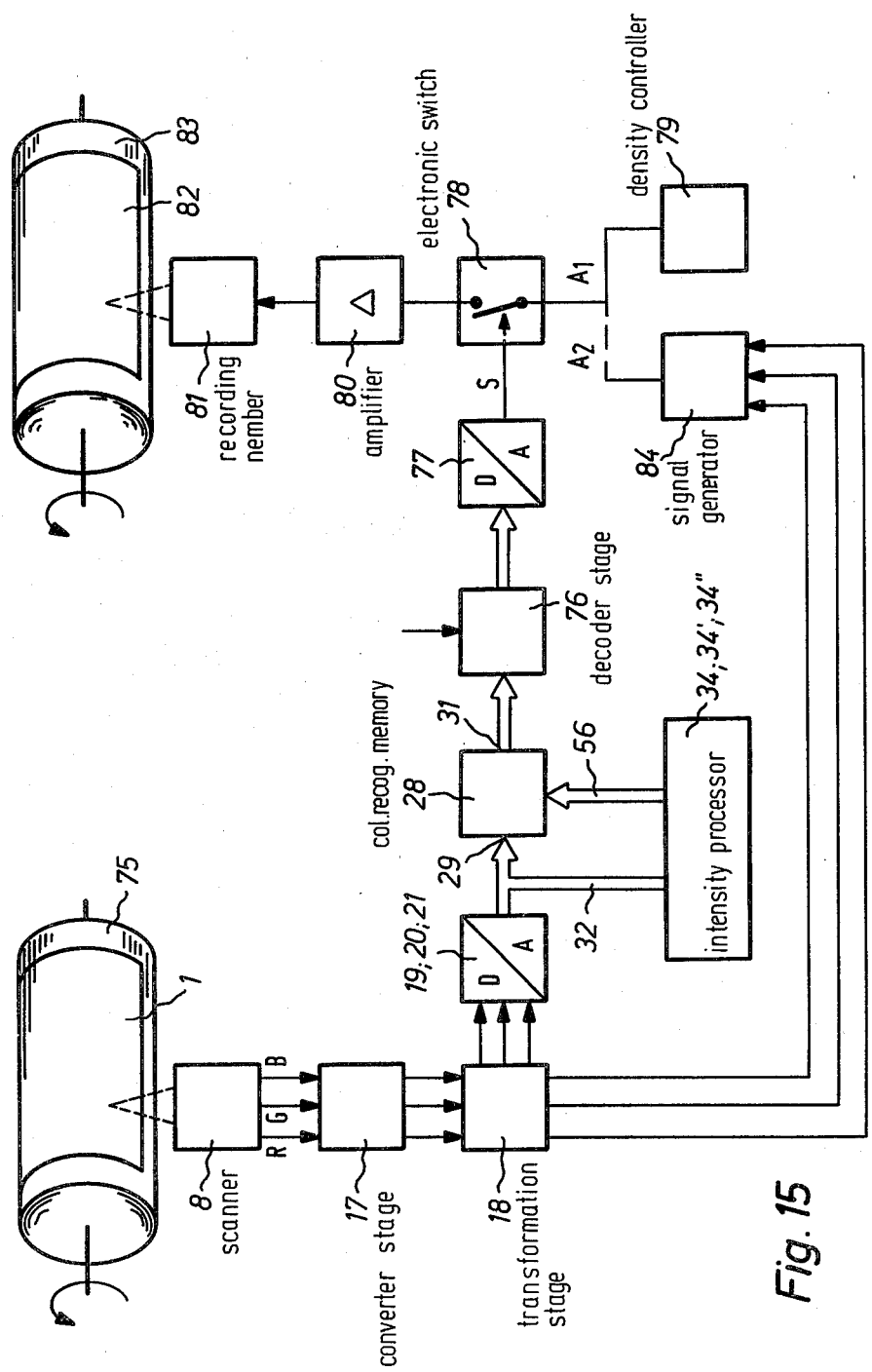
FIG. 15 is an embodiment for circuits using a color scanner for textile, decorative or packing applications.

FIG. 15 shows an embodiment using the circuits according to FIGS. 1, 6, and 10, using a color scanner for color separation sheets for decorative, textile or package printing. As has already been stated in the Background of the Invention, in printing of this type, the colors to be printed are mixed via the printing process, and are then separately transferred to the printing medium. With the aid of the color scanner, the individual colors of the color image must be separated from one another, and a color separation sheet must be fabricated for each separate color.

It will be assumed that the color recognition memory 28 of the color scanner has already been filled according to the process described, with color numbers.

The color image 1, disposed on a rotating drum 75, is scanned point-by-point and line-by-line by the scanner 8. The color coordinates x, y, and z, call up by the scanning process, the corresponding addresses or address locations of the color recognition memory via the address input 29. The color numbers stored in the called up addresses or address locations, are read out via the data output 31, and are supplied to a decoder 76. The decoder stage 76 is pre-selectable to determine for which color image or color numbers a color separation sheet is to be drawn up. The selected color number is converted in a post-coupled digital-to-analog converter 77, into a control signal S, which supplies information with respect to the local distribution of a separated color in the color image 1. The control signal S operates an electronic switch 78, which feeds a constant recording signal $A_1$, of constant writing density, generated in an adjustable density controller 79, through an amplifier 80, if the selected separated color occurs in the scanned color image 1. The light source in the recording member 81 is switched in or out as commanded by the amplified recording signal $A_1$. The light source illuminates a recording medium in the form of a film 82 point-by-point, and line-by-line, which medium is also mounted on a rotating recording drum 83. The illuminated and developed film 82 furnishes the required color separation sheet.

To record half-tone color separation sheets, of colors running into one another, a blend signal $A_2$ can be derived in a blend signal generator 84 from at least one of the intensity color signals red, green or blue, which blend signal $A_2$ is a measure for the color saturation or brightness, that is, for the course of a color.

To record half-tone color separation sheets, the blend signal $A_2$ is passed by means of the electronic switch 78 to the recording member 81, instead of the constant recording signal $A_1$. The control signal S then furnishes information regarding the local distribution of a color from the color image, and the associated blend signal $A_2$ furnishes this information with respect to the relative amounts or intensities of color, so as to reproduce the course of the color.

Prior to recording of the separate colors, the expected result of the printing can be examined on a color monitor. In such a case, a television camera is post-coupled to the color recognition memory 28. The television camera scans the color image 1 to be analyzed, and its color signals call up the appropriate addresses or address locations of the color recognition memory 8. The color numbers control a color generator, which assigns a trichromatic color signal to each color number, for controlling a color monitor.

In lieu of a television camera, it is also possible to use an image memory, such as a refresher memory.

The color image is displayed on a second color monitor directly coupled to the television camera for the extraction of test points, and the test points or test point colors are ascertained with the aid of a cursor and a measuring circuit.

Figure 16:
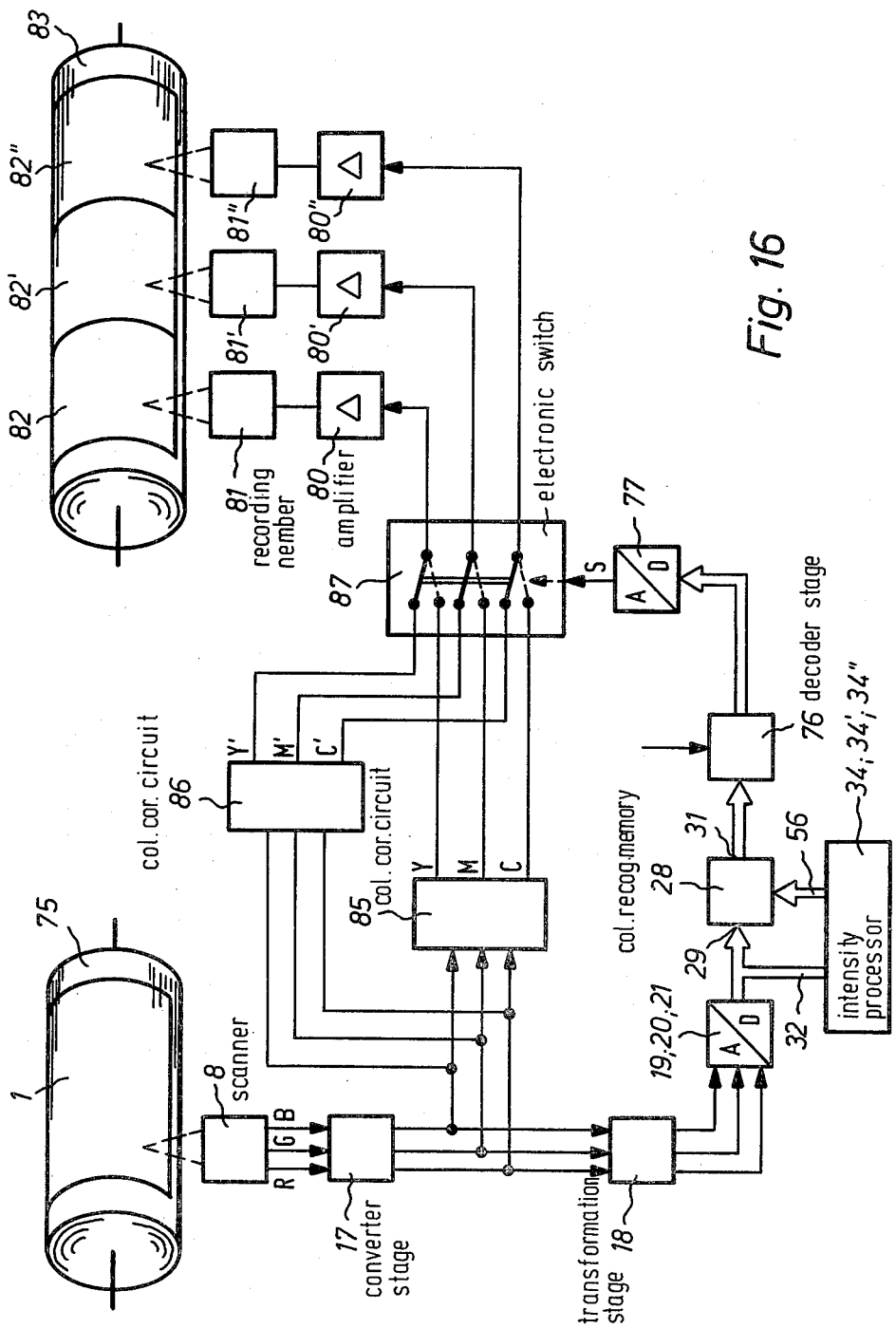
FIG. 16 shows an application of a color scanner for circuits in multiple printing applications.

FIG. 16 shows a further application of the switching circuit for recognizing colors according to FIG. 1, when using selected color correction in a color scanner for printing of multiple colors (paper printing presses).

The color image 1, mounted on the drum 75, is scanned by the scanner 8, point-by-point, and line-by-line, and the color measurement or intensity signals R, G, and B obtained thereby pass via the converter stage 17 to a first color correction circuit 85 for basic correction information of the first color separation signals Y(yellow), M(magenta) and C(cyan).

The color measurement, or intensity signals R, G, and B, are transformed once more in the second color correction circuit 86 for the purpose of selective correction of a predetermined color, or a color range, into second color separation signals Y', M', and C'.

First and second color separation signals are passed to an electronic switch 87, which normally passes the first color separation signals M, Y and C, and passes only the corresponding second color separation signals M', Y', and C' to the amplifiers 80, 80', and 80", respectively, in the case that the color to be selectively corrected occurs in the color image 1.

The so-passed and amplified color separation signals modulate again the brightness of light sources in the recording members 81, 81', and 81", respectively. The recording members 81, 81' and 81" illuminate point-by-point, and line-by-line, the films 82, 82', and 82", mounted on the rotating recording drum 83. The illuminated and developed films are the desired and corrected color separation sheets "yellow", "magenta", and "cyan".

The control signal S for the electronic switch 87 is generated in the circuit according to FIGS. 1, 6, and 10. The operator pre-selects the color to be selectively corrected, or the appropriate color number on a decoder statge 76.

During the recording of the color separation sheets, only the color number of the pre-selected color is passed via the decoder stage 76 to the digital-to-analog transducers 77 post-coupled thereto, and is transformed into the control signal S for the electronic converter 87.

The decoder stage 76 can be dispensed with, if only the color recognition region for the color to be selected has been programmed with the aid of the color intensity processor 34 in the color recognition memory 28.

Summarizing then, in a method of determining the intensity of a plurality of colors on a colored image with the aid of a light source of known spectral composition, which includes a known number of colors, the image including a multiplicity of color ranges the steps comprise: illuminating the colored image with the light source, selecting a number of test points on the colored image, each test point having a test point color, photoelectrically scanning the colored image, thereby deriving the intensity of each illuminated color range, and of each illuminated test point color, measuring the derived intensity of each area color and of each test point color, representing the so measured intensities of each color range as color locations in a color space, that has a predetermined number of separate color recognition regions, assigning each color location spatial coordinates in the color space, memorizing the measured intensity of each test point color, at least one separate test point color being associated with each color recognition region, assigning an identification symbol in terms of the spatial coordinates to each memorized test point color, surrounding each test point color with selected color locations so as to form successive shells, calling up the selected color locations shell by shell at successively increasing distances from a respective test point color, assigning to the called up color location an identification tag corresponding to the identification symbol of a corresponding memorized test point color, further testing a chosen color location as to whether an identification tag has been assigned to it, and if no identification tag has been assigned to the chosen color location, assigning an identification tag to the chosen color location corresponding to the identification symbol of the corresponding memorized test point color, thereafter, terminating the formation of the shells, subsequently, assigning to the chosen color location an identification tag corresponding to the identification symbol of a test point color spatially nearest to the chosen color location in the color space, and subsequently, reading out the identification tags corresponding to the respective color locations.

It is particularly advantageous if first, second, and third memories are utilized, each having a plurality of first, second, and third address locations, respectively; the steps then further comprise digitizing the intensities of each area color and of each test point color, subdividing the color space into a plurality of color zones, assigning the plurality of the first address locations to the color zones, respectively, the first address locations being addressable by the digitized intensities of each color range, storing identification tags and identification symbols in the first address locations corresponding to the digitized color range intensities of each area color, and of each test point color, respectively, storing the intensities of each test point color and the identification symbols corresponding thereto, in respective second address locations of the second memory, the stored intensities and the stored identification symbols constituting a stored roster of test points, storing the spatial coordinates of the color locations making up respective shells in respective third address locations of the third memory, the stored spatial coordinates of the color locations constituting a stored list of shell coordinates, calling up the second and third addresses of the address locations of the second and third memories, respectively, determining the addresses of the first address locations of the first memory in which identification tags from the stored roster of test points and from the stored list of shell coordinates are to be stored, testing the first address locations of the first memory to determine whether any identification tags have been stored therein, and in the event no identification tags have been stored in the first address locations, storing the identification tags corresponding to respective identification symbols in the first address locations, and following termination of the shell formations, alternately calling up the addresses of the first address locations of the first memory yet to be assigned an identification tag, and the addresses of the second address locations of the second memory, the second address locations containing the stored roster of test points, determining from the called up addresses of the first address locations of the first memory yet to be assigned an identification tag, and from the roster of test points obtained from the second address locations of the second memory the smallest spatial distance to the spatially nearest test point, and the identification tag corresponding to the spatially nearest test point, and storing the so determined identification tags in the corresponding called up address locations of the first memory, whereby the so determined identification tags may be read out from the first memory.

It is alternately possible to represent the intensities of each color range and of each test point color in cylindrical coordinates (S, T, L), and to obtain the cylindrical coordinates by a coordinate transformation of a chrominance-luminance color-space into a saturation (S), hue (T), and luminance (L) color space.

It is advantageous if the saturation, hue and luminance space includes a gray axis, and if the gray axis is surrounded with a color recognition zone for "gray".

We wish it to be understood that we do not desire to be limited to the exact details of construction shown and described, for obvious modifications will occur to a person skilled in the art.

Having thus described the invention, what we claim as new and desire to be secured by Letters Patent, is as follows:

1. In a method of preparing for and recognizing colors on a colored image with the aid of a light source of known spectral composition, each color corresponding to a color location in a color space, each color location being defined by a color component triplet representing the spatial coordinates of said color location in said color space, and being spaced from another color location by a spatial distance, said color space including at least one spatial color range being defined by at least one of said color locations, the steps comprising:
preparatory to color recognition
selecting in said colors of said image a number of test points, each test point having a test point color;
illuminating said image with said light source;
photoelectrically measuring the color component triplets of the selected test point colors;
defining a certain identification symbol for each selected test point color;
assigning the defined identification symbols to the color locations corresponding to respective selected test point colors;
calling up a plurality of said color locations from said color space;
determining for each called-up color location the spatial distance separating said called-up color location from the color location of each selected test point color;
selecting the color location of each test point color having the shortest distance from any of said called-up color locations respectively;
determining the identification symbols corresponding to the color locations of said test point colors having said shortest distances, respectively;
assigning said determined identification symbols to said corresponding called-up color locations, so as to form color recognition ranges around the color locations of the selected test point colors within said color space, all color locations assigned the same identification symbol forming said color recognition ranges corresponding to said color ranges, respectively; and
thereafter performing the color recognition steps of:
photo-electrically scanning said colored image point-by-point and line-by-line so as to obtain the color component triplets corresponding to each color scanned from said image;
calling up the color locations represented by said color component triplets and the identification symbols associated therewith; and
reading out said associated identification symbols, whereby the image colors are identified.

2. In a method as claimed in claim 1, wherein at least two image colors are to be combined into a color range and recognized as a single color, and wherein the selecting step of said test points and said test point colors is further defined by
selecting at least one test point in each of said image colors, which are to be combined to a color range; and
wherein the step of defining identification symbols is further defined by
defining certain identification symbols for each color range, the colors of which are to be recognized as a single color; and wherein the assigning step of said identification symbols is futher defined by assigning to all color locations of the test point colors which are to be combined to a certain color range the identification symbol already assigned to said color range.

3. In a method as claimed in claim 1 or 2, carried out with the aid of memory means having a plurality of storage locations, each storage location representing a color location of said color space, said storage locations being addressable by digital signals representing the color component triplets of said corresponding color locations, and further comprising the steps of:

storing the color locations associated with said identification symbols, respectively;

said color-recognition step of calling-up color locations represented by said color component triplets and the identification symbols associated therewith including the step of recognizing the image colors in terms of said digital signals;

obtaining said digital signals representing said color component triplets from the photo-electrical scanning step, addressing the storage locations of said memory means by said digital signals obtained during the recognizing step; and reading out said corresponding identification symbols from said memory means, said determining, selecting, assigning and readout steps being carried out by digital processing steps, whereby the image colors obtained during the color recognition steps are identified by said digital processing steps.

4. In a method as claimed in claim 1 or 2, wherein some called-up color locations are equidistant from the color locations of several selected test point colors, and wherein some of said identification symbols allotted to said test point colors occur more frequently than others, and further comprising the step of assigning, in the event one of said called-up color locations is equidistant from the color locations of said several selected test point colors, the identification symbol occurring most frequently among said several test point colors allotted to said one called-up color location.

5. In a method for preparing and recognizing colors on a colored image with the aid of a light source of known spectral composition, each color location corresponding to a color location in a color space, said color locations being defined by color component triplets representing the spatial coordinates of said color locations in said color space, said color space including at least one spatial color range being defined by at least one color location, the steps comprising:
preparatory to color recognition
selecting in said colors of said image a number of test points, each test point having a test point color;
illuminating said image with said light source;
photo-electrically measuring the color component triplets of the selected point colors;
defining a certain identification symbol for each selected test point color;
assigning the defined identification symbols to the color locations corresponding to respective selected test point colors;
surrounding the color location of each test point color with selected color locations so as to form shells of successively increasing size around the color location of the color location of the corresponding test point color,
calling-up said selected color locations shell by shell at successively increasing distances from the color location of the corresponding test point color,
checking each called-up color location to determine whether an identification symbol has already been allotted thereto
assigning the identification symbol allotted to a corresponding selected test point color to said called-up color location, provided no identification symbol has already been allotted to said called-up color location, all color locations bearing the same identification symbol thereby forming a color recognition region around the color locations of each corresponding selected test point color, each color recognition region representing a corresponding color range,
thereafter performing the color recognition steps of:
photo-electrically scanning said colored image so as to obtain the color component triplets corresponding to each image color,
calling-up the color locations represented by said color component triplets and the identification symbols associated therewith, and
reading out said identification symbols, whereby the image colors are identified.

6. In a method as claimed in claim 5, wherein at least two image colors are to be combined to a color range and recognized as a single color, respectively, and wherein the selecting step of said test points and test point colors is further defined by selecting at least one test point in each of the image colors which are to be combined to a color range;
defining certain identification symbols for each color range, the colors of which are to be recognized as a single color; and
wherein the assigning step of said identification symbols is further defined by
assigning to all color locations of the test point colors which are to be combined to a certain color range the same identification symbol already assigned to said certain color range.

7. In a method as claimed in claims 5 or 6, wherein the color location surrounding step further comprises the step of forming a plurality of first shells around said color locations of said test point colors, and equidistant therefrom, respectively, and thereafter forming other shells of successively increasing size in timely succession.

8. In a method as claimed in claims 5 or 6, wherein the step of calling-up said selected color locations comprises calling-up said color locations successively.

9. In a method as claimed in claim 5 or 6, wherein the color location surrounding step further comprises the step of forming each shell substantially as a sphere.

10. In a method as claimed in claim 5 or 6, wherein the color location surrounding step further comprises the step of forming said shells substantially in the shape of a cube.

11. In a method as claimed in claim 5 or 6, wherein said color space is subdivided into a plurality of color zones representing said color locations, said color zones being defined by digital signals, further comprising the steps of:

generating said digital signals by digitization of said color component triplets, respectively, obtained from the photo-electric scanning step, and approximating said shells by said digital signals corresponding to said selected color locations, respectively.

12. In a method as claimed in claim 11, further utilizing first, second and third memories, having a plurality of first, second and third storage locations, respectively, and further comprising the steps preparatory to color recognition, of digitizing the color component triplets, subdividing said color space into a plurality of color zones, assigning said plurality of said first storage locations of said first memory to said color zones and to said identification symbols, respectively, said first storage locations being addressable by corresponding digitized color component triplets, storing the identification symbols associated with each selected test point color in corresponding of said first storage locations of said first memory;

the digitized color component triplets ($x_{pn}$, $y_{pn}$, $z_{pn}$) of the color locations of the test point colors and the identification symbols corresponding thereto constituting a sample list, storing said sample list in corresponding second storage locations of said second memory, the spatial coordinates ($x_{sm}$, $y_{sm}$, $z_{sm}$) of the selected color locations forming said shells constituting a shell list, storing said shell list in corresponding third storage locations of said third memory, calling up the addresses of said second and of said third storage locations, determining the color component triplet coordinates ($x_i$, $y_i$, $z_i$) of said selected color locations of said shells from said sample list and from said shell list, addressing said first storage locations by the so determined color component triplet coordinates, and wherein the checking step includes checking each of said addressed first storage locations of said first memory to determine whether an identification symbol has been stored therein, and in the event no identification symbol has been stored in a corresponding of said checked first storage location, storing the identification symbol associated with the corresponding test point color therein, and wherein the calling-up step of the color recognition steps includes addressing said first storage locations by the color component triplet coordinates obtained during the scanning step, and the reading out step includes reading out the identification symbols from said first storage locations.

13. In a method as claimed in claims 5 or 6, wherein a representative shell is designated as the $m^{th}$ shell; the color locations of said $m^{th}$ shell having substantially a distance $r_m$ from the corresponding color location of said test point color forming the center of said representative shell, and wherein the spatial coordinates of a selected color location of said $m^{th}$ shell with respect to said center are $x_{xm}$, $y_{ym}$, and $z_{sm}$, and further comprising the step of deriving said spatial $x_{sm}$, $y_{sm}$, and $z_{xm}$ from the plurality of integers fulfilling the vectorial equation $$r^2_m = x^2_{sm} + y^2_{sm} + z^2_{sm}.$$

14. In a method as claimed in claim 13, further comprising the step of determining said spatial coordinates of said selected color locations of said $m^{th}$ shell by permutation and sign reversal from an ordered co-ordinate triplet fulfilling said vectorial equation $$r^2_m = x^2_{sm} + y^2_{sm} + z^2_{sm}.$$

15. In a method as claimed in claims 5 or 6, wherein a representative shell is designated as the $m^{th}$ shell, the selected color locations of said $m^{th}$ shell having substantially a distance $r_m$ from the corresponding color location of the test point color, said corresponding color location of said test point color forming the center of said representative shell, and wherein the spatial coordinates of a selected color location of said $m^{th}$ shell with respect to said center are $x_{sm}$, $y_{sm}$, and $z_{sm}$, the spatial coordinates of a corresponding color location of the test point color being $x_{pn}$, $x_{pn}$ and $z_{pn}$, the coordinates of the selected color locations called-up within said $m^{th}$ shell being the triplet $x_i$, $y_i$, and $z_i$, and further comprising the step of determining said color component triplet coordinates $x_i$, $y_i$ and $z_i$ in accordance with the vectorial equation $x_i = x_{pn} + x_{sm}$
$y_i = y_{pn} + y_{sm}$
$z_i = z_{pn} + z_{sm}.$ 16. In a method as claimed in claim 15, further utilizing first, second and third memories, having a plurality of first, second and third storage locations, respectively, and further comprising the steps, preparatory to color recognition, of digitizing the color component triplets, subdividing said color space into a plurality of color zones, assigning said plurality of said first storage locations of said first memory to said color zones and to said identification symbols, respectively, said first storage locations being addressable by corresponding digitized color component triplets, storing the identification symbols associated with each selected test point color in corresponding of said first storage locations of said first memory;

the digitized color component triplets ($x_{pn}$, $y_{pn}$, $z_{pn}$) of the color locations of the test point colors and the identification symbols corresponding thereto constituting a sample list, storing said sample list in corresponding second storage locations of said second memory, the spatial coordinates ($x_{sm}$, $y_{sm}$, $z_{sm}$) of the selected color locations forming said shells constituting a shell list, storing said shell list in corresponding third storage locations of said third memory, calling up the addresses of said second and of said third storage locations, determining the color component triplet coordinates ($x_i$, $y_i$, $z_i$) of said selected color locations of said shells from said sample list and from said shell list, addressing said first storage locations by the so determined color component triplet coordinates, and wherein the checking step includes checking each of said addressed first storage locations of said first memory to determine whether an identification symbol has been stored therein, and in the event no identification symbol has been stored in a corresponding of said checked first storage location, storing the identification symbol associated with the corresponding test point color therein, and wherein the calling-up step of the color recognition steps includes addressing said first storage locations by the color component triplet coordinates obtained during the scanning step, and the reading out step includes reading out the identification symbols from said first storage locations.

17. In a method as claimed in claims 5 or 6, further comprising the step of terminating the formation of said shells upon one of said increasing distances from the color location of the corresponding test point color reaching a limiting distance.

18. In a method as claimed in claim 17, wherein said limiting distance is predetermined.

19. In a method as claimed in claim 17, wherein said limiting distance depends on the number of test point colors selected.

20. In a method as claimed in claims 5 or 6, wherein the checking step is carried out at a predetermined rate and further comprising the steps of terminating the formation of said shells, if the allotted identification symbols are encountered at a predetermined frequency.

21. In a method as claimed in claims 5 or 6, further comprising the step of terminating the formation of said shells upon shells formed from neighboring color locations of different test point colors making contact with one another.

22. In a method as claimed in claims 5 or 6, further comprising the steps of
    terminating the formation of said shells, and the assignment of said identification symbols,
    thereafter calling up the color locations still free of any assigned identification symbols,
    assigning to each of said color locations still free of any assigned identification symbols the identification symbol corresponding to the color location of the test point color spatially closest to a corresponding of the color locations called-up.

23. In a method as claimed in claim 22, wherein first, second and third memories are utilized, which have a plurality of first, second and third storage locations, respectively, and further comprising the steps, preparatory to color recognition, of
    digitizing the color component triplets,
    subdividing said color space into a plurality of color zones,
    assigning said plurality of said first storage locations of said first memory to said color zones, and to said identification symbols, respectively, said first storage locations being addressable by corresponding digitized color component triplets,
    storing the identification symbols associated with each selected test point color in corresponding first storage locations of said first memory,
    the digitized color component triplets ($x_{pn}$, $y_{pn}$, $z_{pn}$) of the color locations of the test point colors and the identification symbols corresponding thereto constituting a sample list,
    storing said sample list in corresponding second storage locations, of said second memory,
    the spatial coordinates ($x_{sm}$, $y_{sm}$, $z_{sm}$) of the selected color locations forming said shells constituting a shell list,
    storing said shell list in corresponding third storage locations of said third memory,
    calling up the addresses of said second and of said third storage locations,
    determining the color component triplet coordinates ($x_i$, $y_i$, $z_i$) of said selected color locations of said shells from said sample list and from said shell list,
    addressing said first storage locations by the so determined color component triplet coordinates, and wherein the checking step includes checking each of said addressed first storage locations of said first memory to determine whether an identification symbol has been stored in a corresponding of said checked first storage location,
    storing the identification symbol associated with the corresponding color location of the test point color therein, and
    following termination of the shell formation, alternately addressing and calling up
    said first storage locations still free from having an identification symbol stored therein, and thereafter said second storage locations,
    determining from the addressed and called-up first and second storage locations the color location of a test point color having the smallest spatial distance from each called-up color location, and the identification symbol stored in said second storage location corresponding thereto,
    storing each identification symbol corresponding to the color location of the test point color having the smallest spatial distance from each of said called-up color locations in said first storage locations, and wherein the calling-up step of the color recognition steps includes addressing said first storage locations by the color component triplets obtained during the scanning step, and the reading out step includes reading out the identification symbols corresponding to the color component triplets obtained during the scanning step which have addressed said first storage locations, whereby the colors are identified.

24. In a method as claimed in claims 1 or 5, further utilizing a memory having available a plurality of storage locations, and wherein said image has a limited color content compared to a theoretically available full color content of the color space,
    the steps further comprising
    subdividing said color space into a plurality of color zones,
    digitizing the color component triplets, said color zones being defined by corresponding of said digitized color component triplets,
    assigning said plurality of said storage locations to said plurality of color zones, respectively,
    a first plurality of digitized color component triplets representing said full color content of the color space, said plurality of storage locations being addressable by said first plurality of the color component triplets,
    obtaining a second plurality of digitized color component triplets from said scanning step, so as to represent said limited color content of said image, and matching said second plurality of digitized color component triplets to said first plurality of digitized color component triplets.

25. In a method as claimed in claims 1 or 5, further including at least one photo-electric transducer, and wherein the measuring step includes measuring the color component triplet of each selected test point color by means of said photo-electric transducer.

26. In a method as claimed in claims 1 or 5, further utilizing a color monitor and a cursor, and further comprising the steps of displaying said colored image on said color monitor, and pin-pointing the test points on said image with the aid of said cursor.

27. In a method as claimed in claims 1 or 5, further comprising the steps of digitizing the color component triplets obtained from said colored image at different respective resolutions.

28. In a method as claimed in claims 1 or 5, wherein the color component triplets correspond to the primary color signals of Red, Green, and Blue.

29. In a method as claimed in claims 1 or 5, wherein said color space is a Red, Green and Blue color space, and further comprising the step of coordinate-transforming said Red, Green and Blue color space into a Chrominance/Luminance color space containing chrominance signals (X,Y), and a luminance signal, and wherein said color component triplets correspond to said chrominance signals and to said luminance signal.

30. In a method as claimed in claims 1 or 5, wherein said color space is a Red, Green and Blue color space, and further comprising the step of coordinate-transforming said Red, Green and Blue color space into a Saturation/Hue/Luminance color space containing cylindrical color coordinates, and wherein said color component triplets correspond to said cylindrical color coordinates.

31. In a method as claimed in claim 30, wherein said Saturation, Hue and Luminance color space includes a gray axis, and wherein the color-recognition region forming step includes the step of surrounding said gray axis with said color-recognition region so as to identify a gray color.

32. In a method as claimed in claim 31, further comprising the step of shaping said color-recognition region in the form of a barrel.

33. In a method as claimed in claim 31, further comprising the step of shaping said color recognition region in the shape of a cylinder.

34. In a method as claimed in claim 30, wherein said color-recognition region forming step includes the step of narrowing said color recognition range along the direction of the Hue axis by a coordinate conversion of the color component triplets.

35. In an apparatus preparing for, and recognizing colors on a colored image with the aid of a light source of known spectral composition to illuminate said colored image, each image color corresponding to a color location in a color space, said color locations being defined by a color component triplet representing the spatial coordinates of said color locations in said color space, selected image colors being denoted as test point colors and the image colors being identifiable by corresponding color identification symbols,
comprising in combination:
photo-electric transducer means for scanning said colored image and for measuring the color component triplets of the test point colors and of the image colors to be identified,
analog-to-digital converter means postcoupled to said photo-electric transducer means for converting the measured analog component triplets into digitized color component triplets,
color recognition memory means postcoupled to said analog-to-digital converter means, and including a plurality of first storage locations for storing said color identification symbols, said first storage locations being addressable by said digitized color component triplets,
an identification symbol processor connected to said color recognition memory means, and including
an input stage for the assignment of the identification symbols to the test point colors, respectively,
a sample list being defined by the digitized color component triplets associated with the color locations of said test point colors, and the identification symbols assigned to the color locations of said test point colors, respectively,
test point color memory means connected to said analog-to-digital converter means and to said input stage, and including a plurality of second storage locations for storing said sample list,
address-control means connected to said color recognition memory means and to said test point color memory means for selecting addresses of said test point color memory means and of said color recognition memory means, and for calling up chosen color locations represented by said digitized color component triplets, and
processing means connected to said test point color memory means, to said address control means, and to said color recognition means for determining the spatial distances separating called-up color locations represented by said called-up digitized color component triplets from said color locations of said test point colors represented by color component triplets contained in said sample list, respectively, and for determining the identification symbols to be assigned to the called-up digitized color component triplets, the so determined identification symbols being storable in said color recognition memory means and being capable of being called up therefrom.

36. An apparatus for recognizing colors on a colored image with the aid of a light source of known spectral composition to illuminate said colored image, each image color corresponding to a color location in a color space, said color locations being defined by a color component triplet representing the spatial coordinates of said color locations in said color space, selected image colors being denoted as test point colors and the image colors being identifiable by corresponding color identification symbols,
comprising in combination:
photo-electric transducer means for scanning said colored image and for measuring the color component triplets of the test point colors and of the image colors to be identified,
analog-to-digital converter means postcoupled to said photo-electric transducer means for converting the measured analog component triplets into digitized color component triplets,
color recognition memory means postcoupled to said analog-to-digital converter means, and including a plurality of first storage locations for storing said color identification symbols, said first storage locations being addressable by said digitized color component triplets, and
an identification symbol processor connected to said color recognition memory means, including
an input stage for the assignment of the identification symbols to the test point colors, respectively, a sample list being defined by the digitized color component triplets associated with the color locations of said test point colors and the identification symbols assigned to the color locations of said test point colors, respectively, test point color memory means connected to said analog-to-digital converter means and to said input stage, and including a plurality of second storage locations for storing said sample list, a shell being defined by surrounding the color location of each test point with selected color locations so as to form a multiplicity of shells of successively increasing size around the corresponding test point color, each shell having a plurality of shell coordinates, the shell coordinates of all shells defining a shell list, shell memory means including a plurality of third storage locations for storing said shell list, address-control means connected to said test point color memory means and to said shell memory means for addressing said test point color memory means and said shell memory means, processing means connected to said test point color memory means, to said shell memory means and to said color recognition memory means for determining selected addresses from said sample list and from said shell list for addressing said color recognition memory means by said selected addresses, and for determining the identification symbols to be assigned to the called-up addresses of said color recognition memory means, and switching means for checking whether said first storage locations of said color recognition memory means are free from any identification symbols already stored therein.

37. An apparatus as claimed in claim 36, wherein said address-control means are further connected to said color recognition memory means for addressing said color recognition memory means, and for calling up chosen color locations represented by digitized color component triplets, and wherein said processing means are additionally arranged to terminate the formation of said shells, and to subsequently call up the storage locations of the color recognition memory means free of any identification symbol stored therein, and to store in each of the subsequently called-up storage locations the identification symbol assigned to the color location of the test point color spatially nearest to the color location corresponding to said called-up storage location.

38. An apparatus as claimed in claims 35, 36 or 37, wherein said color component triplets represent the primary colors Red, Green and Blue, and wherein said photo-electric transducer means generate corresponding primary color signals, and further comprising first color coordinate transformation means postcoupled to said photo-electric transducer means for converting said primary color signals into chrominance signals and into a luminance signal.

39. An apparatus as claimed in claims 35, 36 or 37, wherein said color component triplets representing the primary colors are Red, Green and Blue, and wherein said photo-electric transducer means generate corresponding primary color signals, and further comprising first color coordinate transformation means postcoupled to said photo-electric transducer means for converting said primary color signals into chrominance signals and a luminance signal, and second color coordinate transformation means postcoupled to said first color coordinate transformation means for converting said chrominance signals and said luminance signal into a saturation signal, a hue signal, and a brightness signal.

* * * * *